US010220333B2

(12) United States Patent
Matsuura

(10) Patent No.: US 10,220,333 B2
(45) Date of Patent: Mar. 5, 2019

(54) ATOMIZING SEPARATION METHOD AND ATOMIZING SEPARATION DEVICE

(71) Applicant: Nanomist Technologies Co., Ltd., Tokushima (JP)

(72) Inventor: Kazuo Matsuura, Naruto (JP)

(73) Assignee: NANOMIST TECHNOLOGIES CO., LTD., Tokushima (JP)

( * ) Notice: Subject to any disclaimer, the term of this patent is extended or adjusted under 35 U.S.C. 154(b) by 500 days.

(21) Appl. No.: 14/976,644

(22) Filed: Dec. 21, 2015

(65) Prior Publication Data

US 2016/0184738 A1 Jun. 30, 2016

(30) Foreign Application Priority Data

Dec. 26, 2014 (JP) ................................ 2014-266247

(51) Int. Cl.
*B01D 17/00* (2006.01)
*B01D 46/02* (2006.01)
(Continued)

(52) U.S. Cl.
CPC .............. *B01D 17/00* (2013.01); *B01D 1/14* (2013.01); *B01D 1/16* (2013.01); *B01D 3/007* (2013.01);
(Continued)

(58) Field of Classification Search
CPC . B01D 17/00; B01D 1/14; B01D 1/16; B01D 3/007; B01D 3/346; B01D 46/02;
(Continued)

(56) References Cited

U.S. PATENT DOCUMENTS

| | | | | |
|---|---|---|---|---|
| 2006/0027487 | A1 | 2/2006 | Matsuura | |
| 2011/0053234 | A1 | 3/2011 | Matsurra et al. | |
| 2014/0048467 | A1* | 2/2014 | Matsuura ................ | B01D 1/14 210/175 |

FOREIGN PATENT DOCUMENTS

| | | |
|---|---|---|
| JP | 2002-273412 | 9/2002 |
| JP | 2006-77225 | 3/2006 |

(Continued)

OTHER PUBLICATIONS

Extended European Search Report dated Apr. 15, 2016 in European patent application No. 15202678.7.

*Primary Examiner* — Cabrena Holecek
(74) *Attorney, Agent, or Firm* — Wenderoth, Lind & Ponack, L.L.P.

(57) ABSTRACT

A method for separating at least one of components with different vapor pressures from a solution that includes the components by atomizing the solution. The method includes an atomization step, and a separation step. A solution L is atomized into mist in air whereby producing mist-mixed air in the atomization step. Droplets of the mist included in the mist-mixed air are classified according to their particle diameter sizes, and exhaust air that contains air as carrier gas is exhausted in the separation step. In the atomizing separation method, the heat energy of both of the latent heat and sensible heat that are included in the exhaust air exhausted in the separation step are collected, and one or both of the solution L to be atomized in the atomization step and air to be blown toward the solution L are heated by the collected heat.

15 Claims, 11 Drawing Sheets

(51) Int. Cl.

| | |
|---|---|
| ***B04C 9/00*** | (2006.01) |
| ***B01D 1/14*** | (2006.01) |
| ***B01D 1/16*** | (2006.01) |
| ***B01D 3/00*** | (2006.01) |
| ***B01D 3/34*** | (2006.01) |
| ***B01D 5/00*** | (2006.01) |

(52) U.S. Cl.
CPC .......... *B01D 3/346* (2013.01); *B01D 5/0039* (2013.01); *B01D 46/02* (2013.01); *B04C 9/00* (2013.01); *B04C 2009/005* (2013.01); *Y02B 30/52* (2013.01); *Y02P 70/34* (2015.11)

(58) Field of Classification Search
CPC . B01D 46/0039; B04C 2009/005; B04C 9/00; Y02B 30/52; Y02P 70/34
See application file for complete search history.

(56) References Cited

FOREIGN PATENT DOCUMENTS

| | | |
|---|---|---|
| JP | 2007-38052 | 2/2007 |
| JP | 2007-118005 | 5/2007 |
| JP | 2012-96206 | 5/2012 |
| WO | 2009/122728 | 10/2009 |

* cited by examiner

ATOMIZING SEPARATION METHOD AND ATOMIZING SEPARATION DEVICE

CROSS-REFERENCE TO RELATED APPLICATIONS

The present application claims priority under 35 U. S. C. § 119 to Japanese Patent Application No. 2014-266,247, filed Dec. 26, 2014. The contents of this application are incorporated herein by reference in their entirety.

BACKGROUND OF THE INVENTION

1. Technical Field

The present disclosure relates to an atomizing separation method and an atomizing separation device for separating at least one of components with different vapor pressures from a solution that includes the components by atomizing the solution into mist, and in particular to an atomizing separation method and an atomizing separation device that are suitable for separation of hot spring water, sea water or waste fluid, or a solution that contains a solute (e.g., organic acid, salt, sugar, amino acid, fatty acid, glycerol, glycol, nucleic acid and extract) in a solvent (e.g., water).

2. Description of Related Art

When solvents (e.g., water) in which low vapor pressure solutes are dissolved are removed from solutions of the solvents and the solutes, the solutions will have various features. For example, the hot spring water can be easily carried after condensed by removing water. This is convenient. The reason is that hot spring water the same as natural hot spring can be provided for home or public bath by mixing the condensed hot spring water with the bath water, or the like. For example, in the case where hot spring water is condensed to a concentration of 100-fold by removing water, only 2 liters of the condensed hot spring water is required to be mixed with a 200-liter home bathtub in order to provide hot spring water having the same water quality as the natural hot spring. 2 liters of condensed hot spring water can be easily transported by parcel delivery services, and the like. On the other hand, 200 liters of hot spring water cannot be easily transported.

Devices have been developed which condense hot spring water by evaporating the water component from the hot spring water or by separating the water component by using a reverse osmotic membrane (see Laid-Open Patent Publication Nos. JP 2002-273,412 A and JP 2007-38,052 A1). Also, a closed-loop chamber structure condensing device has been developed which extracts and condenses alcohol from the alcoholic aqueous solutions (see International Publication No. WO 2009-122,728 A1).

The device disclosed in JP 2002-273,412 A evaporates and removes the water component from hot spring water whereby condensing the hot spring water. This device consumes a large amount of energy. In addition, it is difficult for this device to condense hot spring water to a high concentration. The reason for large energy consumption is the heat of vaporization of water is very large, which requires this device to consume a large amount of energy as the large heat of vaporization when water is evaporated and removed. On the other hand, the reason for difficulty in condensing hot spring water to a high concentration is that hot spring components will be deposited and adhered on the surface of the device, which evaporates the water component. If hot spring components are deposited on the surface of the evaporating device, the hot spring components will reduce thermal conduction from the device to the hot spring water, and the evaporation efficiency of the device. In addition, the deposited substance cannot be easily removed. As a result, a large amount of manpower is required to remove the substance.

The device disclosed in JP 2007-38,052 A1 passes hot spring water through the reverse osmotic membrane for removal of the water component. It is difficult for this device to efficiently and quickly remove the water component from the hot spring water. For this reason, the condensation cost in this device will be very high. In addition, it is necessary to pass water through the reverse osmotic membrane in the reverse direction after the reverse osmotic membrane is used for a certain time period in order to clean up the reverse osmotic membrane. Therefore, this device cannot continuously operate for a long time.

The device disclosed in WO 2009-122,728 A1 vibrates an aqueous alcohol solution at an ultrasonic frequency to produce mist, and collects the mist to produce highly concentrated alcohol. In this device, carrier gas is circulated between an atomizer and a collector, in other words, in a closed loop so that the atomized mist is separated from the carrier gas and collected by the collector whereby increasing the alcohol concentration. When the alcohol aqueous solution is atomized into mist by ultrasonic vibration, the alcohol concentration of the mist will become higher than the alcohol concentration of the solution which is not atomized. Accordingly, alcohol with a higher concentration than the solution can be obtained by collecting the mist from the carrier gas. In this device, since the alcohol concentration is increased by collecting the mist from the carrier gas while circulating the carrier gas in the closed loop, the carrier gas (e.g., air) to be supplied to the atomizer for ultrasonic vibration of the solution is circulated and is used in the closed loop without exhaust. Since this device is necessarily collect fine mist for condensation, the mechanism for efficiently collecting the fine mist will be complicated. On the other hand, although the alcohol concentration of the mist carried in the carrier gas becomes higher than the solution, the difference is small. For this reason, the alcohol concentration cannot be so high in the device which collects the mist from the carrier gas.

The present invention has been developed for solving the aforementioned disadvantages. It is one object of the present invention to provide an atomizing separation method and an atomizing separation device capable of separating at least one of components with different vapor pressures from a solution that includes the components by atomizing the solution into mist at very high efficiency while reducing the separation cost.

SUMMARY OF THE INVENTION

An atomizing separation method according to a first aspect of the present invention is a method for separating at least one of components with different vapor pressures from a solution L that includes the components by atomizing the solution including an atomization step, and a separation step. A solution L is atomized into mist in air whereby producing mist-mixed air in the atomization step. Droplets of the mist included in the mist-mixed air are classified according to their particle diameter sizes, and exhaust air that contains air as carrier gas is exhausted in the separation step. In the atomizing separation method, the heat energy of both of the latent heat and sensible heat that are included in the exhaust air exhausted in the separation step are collected, and one or both of the solution L to be atomized in the atomization step and air to be blown toward the solution L are heated by the collected heat.

In an atomizing separation method according to a second aspect of the present invention, the solution L to be atomized in the atomization step can be a solution L containing a solute that has a vapor pressure lower than the solvent, and air that contains fine mist with a smaller particle diameter can be exhausted as the exhaust air, while the classified larger mist droplets can be collected and fed back to the solution L in the separation step whereby condensing the solution L.

In an atomizing separation method according to a third aspect of the present invention, the solution L to be atomized in the atomization step or air can be heated by external energy that is supplied from the outside.

In an atomizing separation method according to a fourth aspect of the present invention, after the sensible heat of the exhaust air is collected by a heat exchanger 55, the exhaust air, which is exhausted in the separation step, can be pressurized and supplied to a condenser 47, and the condenser 47 can collect the heat of condensation of a vaporized component as the latent heat of the exhaust air so that the latent heat and sensible heat of the exhaust air can be collected as the collected heat.

In the atomizing separation method according to a fifth aspect of the present invention, after the sensible heat of the exhaust air is collected by a heat exchanger 55, the latent heat of the exhaust air which passes through the heat exchanger 55 can be collected by a heat-pump-type latent-heat-collector 42.

In an atomizing separation method according to a sixth aspect of the present invention, the separation step can include first and second separation steps. The droplets of the mist, which is included in the mist-mixed air, are classified according to their particle diameter sizes, and the classified larger mist droplets are fed back to the solution in the first separation step. The mist droplets that are included in the mist-mixed air from which the larger mist droplets have been removed in the first separation step are further classified according to their particle diameter sizes, and the classified relatively large mist droplets are fed back to the solution L, while the mist-mixed air that contains fine mist from which the relatively larger mist droplets have been separated are exhausted in the second separation step. The larger mist droplets that are separated and fed back to the solution L in the first separation step have particle diameters larger than the relatively larger mist droplets that are separated in the second separation step.

In an atomizing separation method according to a seventh of the present invention, the flow rate of the mist-mixed air can be 0.5 m/sec or greater in the separation step.

An atomizing separation method according to an eight aspect of the present invention can include a filtration step before the atomization step. The solution L to be atomized can be filtered in the filtration step. A part of solvent can be removed by passing the solution L through a reverse osmotic membrane 61 in the filtration step, and the liquid from which the part of solvent has been removed is atomized into mist in the atomization step.

An atomizing separation device according to a ninth aspect of the present invention is a device for separating at least one of components with different vapor pressures from a solution L that includes the components by atomizing the solution. The device includes an atomizer 1, a blower 2, a classifier 3, an exhaust-heat collector 4, and an exhaust-heat-based heater 5. The atomizer 1 atomizes a solution L into mist in air whereby producing mist-mixed air. The blower 2 blows air into the atomizer 1. The classifier 3 classifies droplets of the mist included in the mist-mixed air that is discharged from the atomizer 1 according to their particle diameter sizes, and exhausts exhaust air that contains air as carrier gas. The exhaust-heat collector 4 collects the heat energy of both of the latent heat and sensible heat that are included in the exhaust air exhausted from the classifier 3. The exhaust-heat-based heater 5 heats one or both of the solution L in the atomizer 1 and the air by using the collection heat that is collected by the exhaust-heat collector 4. In this atomizing separation device, the heat energy of both of the latent heat and sensible heat of the exhaust air, which is discharged from the atomizer 1, is collected as the collection heat by the exhaust-heat collector 4, and the exhaust-heat-based heater 5 heats the solution L in the atomizer 1 or the air with the collection heat.

In an atomizing separation device according to a tenth aspect of the present invention, the solution L to be atomized into mist in air by the atomizer 1 can be a solution L containing a solute that has a vapor pressure lower than the solvent, and the exhaust air that contains fine mist with a smaller particle diameter, which is classified by the classifier 3, can be exhausted to the outside, while the larger mist droplets, which are classified by the classifier 3, are fed back to the solution L whereby condensing the solution L.

In an atomizing separation device according to an eleventh aspect of the present invention, the exhaust-heat collector 4 includes a sensible-heat collector 41, and a latent-heat collector 42. The sensible-heat collector 41 collects the sensible heat of the exhaust air, which is exhausted from the classifier 3. The latent-heat collector 42 collects the latent heat of the exhaust air, which is exhausted from the sensible-heat collector 41.

In an atomizing separation device according to a twelfth aspect of the present invention, the latent-heat collector 42 can include a compressor 46, a condenser 47, and an expansion valve 48. The compressor 46 pressurizes the exhaust air, which is exhausted from the classifier 3. The condenser 47 condenses a vaporized component that is included in the exhaust air that is pressurized by the compressor 46. The expansion valve 48 is connected to the exhaust side of the condenser 47. The condenser 47 can be connected to the exhaust-heat-based heater 5.

In an atomizing separation device according to a thirteenth aspect of the present invention, the latent-heat collector 42 can include an evaporator 56, a compressor 57, a second condenser 58, and an expansion valve 59. The evaporator 56 supplies heat energy to a refrigerant to be circulated by using the heat energy of the exhaust air, which is exhausted from the classifier 3, so that the refrigerant can be evaporated. The compressor 57 pressurizes the refrigerant gas that is discharged from the evaporator 56. The second condenser 58 cools and liquefies the refrigerant gas that is discharged from the compressor 57, and can generate the heat of condensation. The expansion valve 59 is connected between the second condenser 58 and the evaporator 56. The second condenser 58 can serve as the exhaust-heat-based heater 5.

In an atomizing separation device according to a fourteenth aspect of the present invention, the exhaust-heat-based heater 5 can include an exhaust-heat-based air heater 5A, and an exhaust-heat-based solution heater 5B. The exhaust-heat-based air heater 5A heats the air to be supplied to the atomizer 1. The exhaust-heat-based solution heater 5B heats the solution to be supplied to the atomizer 1.

In an atomizing separation device according to a fifteenth aspect of the present invention, the classifier 3 can include first and second classifiers 3A and 3B that are connected in series to each other. The mist-mixed air can be supplied from the first classifier 3A to the second classifier 3B, and the mist droplets that are separated from the mist-mixed air by the first classifier 3A can be larger than the mist droplets that are separated from the mist-mixed air by the second classifier 3B.

In the atomizing separation device according to sixteenth the present According to invention, the classifier 3 can include a cyclone classifier 35 or a bag filter.

According to an atomizing separation method of the first aspect of the present invention, and an atomizing separation device of the ninth aspect of the present invention, at least one of components with different vapor pressures can be separated from a solution that includes the components by atomizing the solution into mist at very high efficiency while reducing the separation cost. The reason is that, after a solution is atomized into mist in air whereby producing mist-mixed air, the mist droplets, which are included in the mist-mixed air, are classified according to their particle diameter sizes, while the air that includes mist subjected to the classification is exhausted, and the heat energy of both of the latent heat and sensible heat that are included in the exhausted air are collected so that the solution to be atomized and/or air is heated by using the collected heat.

In addition, according to the method and device of the present invention, since the heat energy of both the latent heat and the sensible heat is collected from the exhausted air, and the air and the solution, which are supplied to the atomizer, are heated by using the collected heat, which is exhausted in known methods and devices, the heat that is exhausted in known methods and devices can be effectively used to heat the solution and the air. Therefore, the atomization efficiency of the solution can be improved by heating the air and the solution by effectively using the exhausted heat of both the latent heat and the sensible heat. As a result, at least one of components with different vapor pressures can be separated from a solution that includes the components by atomizing the solution into mist by a smaller amount of energy. In particular, according the atomizing separation method and device of the first aspect of the present invention, since the atomization efficiency can be improved by efficiently collecting the heat energy including not only the sensible heat but also the latent heat, the amount of heat energy that is supplied from the outside can be reduced. As a result, there is an advantage that at least one of components with different vapor pressures can be more efficiently separated from a solution that includes the components by atomizing the solution into mist.

According to an atomizing separation method of the second aspect of the present invention, and an atomizing separation device of the tenth aspect of the present invention, the solution can be condensed to a very high concentration by a single process while at least one of components with different vapor pressures can be separated from a solution that includes the components by atomizing the solution into mist at very high efficiency and the separation cost is reduced. The reason is that, after the solution, which contains a solute with a vapor pressure lower than a solvent, is atomized into mist in air, the mist droplets, which are included in the mist-mixed air, are classified according to their particle diameter sizes, and the exhaust air containing fine mist with smaller particle diameter is exhausted to the outside while the larger mist droplets are fed back to the solution, so that the solution is condensed in the aforementioned method and device.

When a solution containing a solute with the vapor pressure lower than a solvent is atomized, the concentration of the solute varies in accordance with the particle diameter of the mist droplets. Specifically, larger droplets will have a high concentration of the solute, while smaller droplets will have a low concentration of the solute and the most parts of the smaller droplets will be the solvent. For this reason, the concentration of the solute can become high, in other words, the solute can be condensed by removing the solvent by exhausting fine mist together with air as the exhaust air to the outside. For example, in the case where hot spring water is atomized, almost no hot spring components will be included in fine mist, in other words, almost all the part of fine mist will be water as the solvent. Accordingly, the water component can be removed from hot spring water by exhausting the fine mist together with air. According to the aforementioned method and device, since water as the solvent can be removed from the hot spring water not by evaporating the water but by removing fine mist of water, heat of vaporization is not required to remove the solution from the hot spring water. The energy required to atomize the solution is much smaller than the energy required to evaporate the solution. Also, the energy required to classify fine mist and to exhaust it outside together with air is very small. Therefore, according to the method and device of the present invention, the solutions such as hot spring water can be efficiently condensed by separating solvents such as water from the solutions with a very small amount of energy. In addition, since the solution is atomized into mist, and the solvent such as water is removed by exhausting fine mist together with air to the outside, the solution can be condensed to a very high concentration without drawbacks such as adhesion of a deposited substance dissimilar to the method for separating a solvent from a solution by evaporating the solvent by heating the solvent for evaporation. For example, according to the method and the device of the present invention, hot spring water can be condensed to a concentration of 100-fold without deposition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
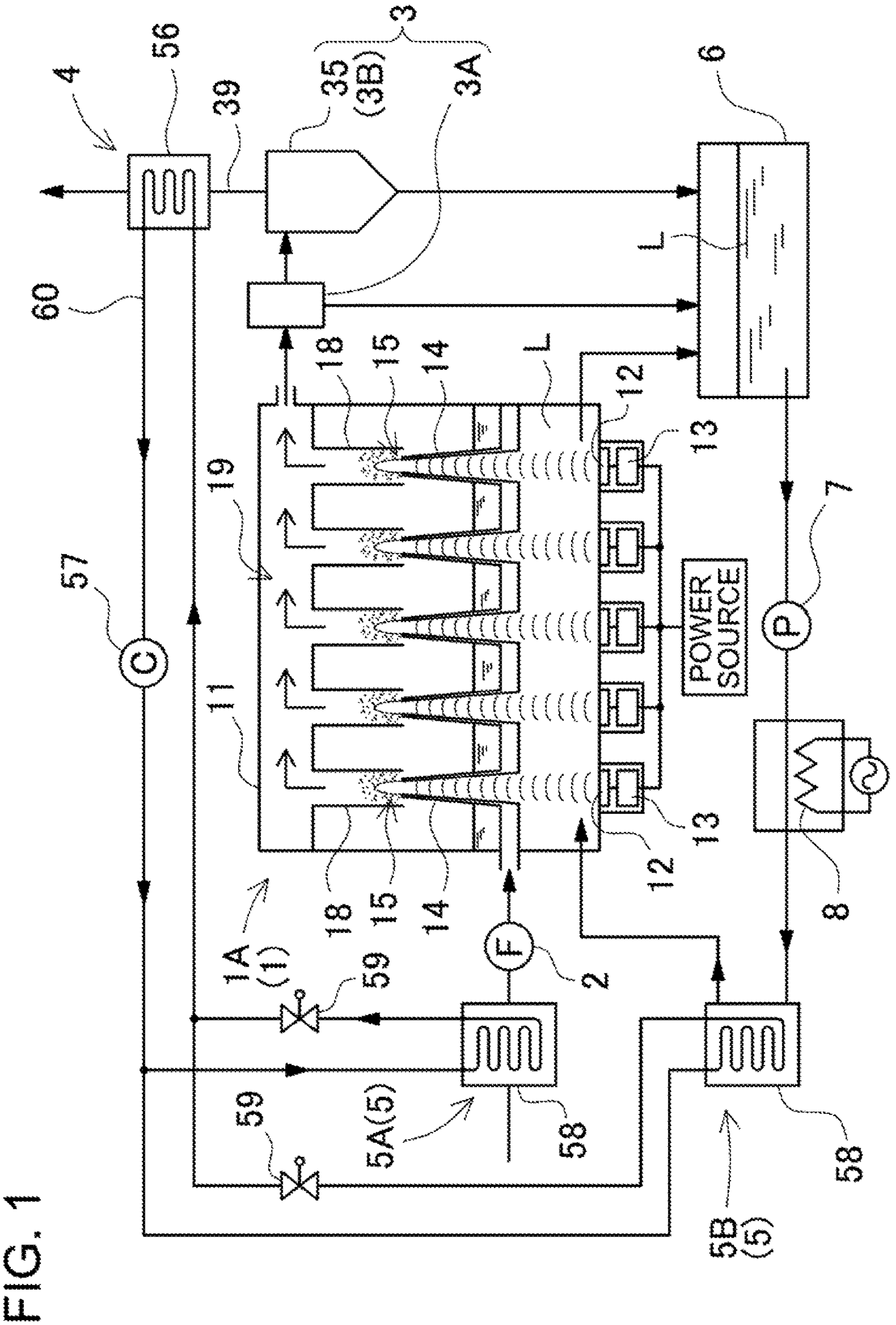
FIG. 1 is a schematic view showing the structure of an atomizing separation device according to one embodiment of the present invention.

The embodiments will now be described with reference to the accompanying drawings, wherein like reference numerals designate corresponding or identical elements throughout the various drawings.

The following description will describe embodiments according to the present invention with reference to the drawings. It should be appreciated, however, that the embodiments described below are illustrations of an atomizing separation method and an atomizing separation device to give a concrete form to technical ideas of the invention, and an atomizing separation method and an atomizing separation device of the invention are not specifically limited to description below. In this specification, reference numerals corresponding to components illustrated in the embodiments are added in "CLAIM" and "SUMMARY OF THE INVENTION" to aid understanding of claims. However, it should be appreciated that the members shown in claims attached hereto are not specifically limited to members in the embodiments.

An atomizing separation method and an atomizing separation device according to the present invention separate at least one of components with different vapor pressures from a solution that includes the components by atomizing the solution into mist. After atomizing the solution into mist in air whereby producing mist-mixed air, the method and device classify mist in the mist-mixed air into fine mist droplets and larger mist droplets, and exhaust air containing the fine mist droplets to the outside so that at least one of components with different vapor pressures is separated from a solution that includes the components. The atomizing separation method and device condense a solution containing a solute that has a vapor pressure lower than a solvent. According to the method and device of the present invention, the solvent is removed from the solution by classifying mist in the mist-mixed air into fine mist droplets and larger mist droplets, and exhausting exhaust air containing the fine mist droplets to the outside after atomizing the solution into mist in air and producing mist-mixed air. The solution can be a solution in which a solute with a low vapor pressure dissolves in water (e.g., hot spring water, seawater or waste fluid), or a solution in which at least one of organic acid, salt, sugar, amino acid, fatty acid, glycerol, glycol, nucleic acid and extract dissolves in a solvent (e.g., water, etc.).

When a solution is atomized into mist, the concentration of its solute of the mist varies in accordance with the particle diameter of the mist droplets. Specifically, the solute concentration of fine mist droplets will be lower than larger mist droplets. For this reason, the concentration of the solute can be increased by removing the solvent from the solution by exhausting fine mist together with air. Dissimilar to the known closed-loop type chamber condensation method and device, the method and device of the present invention do not collect fine mist in the condensation. According to the method and device of the present invention, the concentration of the solute is increased by exhausting fine mist together with air to the outside.

Each of atomizing separation devices shown in FIGS. 1 to 7 includes an atomizer 1, a blower 2, classifier 3, an exhaust-heat collector 4, and an exhaust-heat-based heater 5. The atomizer 1 atomizes a solution into mist in air whereby producing mist-mixed air. The blower 2 blows air into the atomizer 1. The classifier 3 classifies the mist droplets, which is included in the mist-mixed air produced by the atomizer 1, according to their particle diameters, and feeds the classified larger mist droplets back to the solution while exhausting fine mist droplets with a small particle diameter to the outside as mist-mixed air in which air serves as carrier gas. The exhaust-heat collector 4 collects the heat energy of both of the latent heat and sensible heat from the exhaust air, which contains the fine mist droplets and is exhausted from the classifier 3. The exhaust-heat-based heater 5 heats one or both of air and the solution to be supplied to the atomizer 1 by using the heat that is collected by the exhaust-heat collector 4.

In the aforementioned atomizing separation device, the solution is condensed by removing a water component by exhausting mist-mixed air containing fine mist droplets into which mist is classified by the classifier 3 as the exhaust air to the outside. In addition, the heat energy of both of the latent heat and sensible heat that are included in the exhaust air is collected by the exhaust-heat collector 4, and the collected heat is supplied to the exhaust-heat-based heater 5 so that the solution L to be atomized or air is heated by the exhaust-heat-based heater 5. As a result, the solution L can be efficiently condensed.

In the atomizers 1 shown in FIGS. 1 to 4, 6 and 7, the solution is atomized into mist in air by ultrasonic vibration. The ultrasonic atomizer 1A includes an atomization chamber 11, a plurality of ultrasonic vibrators 12, and ultrasonic power sources 13. The atomization chamber 11 has a closed structure, and is supplied with the solution and air. The ultrasonic vibrators 12 ultrasonically vibrate the solution in the atomization chamber 11 whereby atomizing the solution into mist. The ultrasonic power sources 13 supply AC power to the ultrasonic vibrators 12.

The atomization chamber 11 is a closed chamber. The solution L in the atomization chamber 11 is vibrated at an ultrasonic frequency, and is atomized into mist in air. The atomized mist is mixed with air so that mist-mixed air is produced. The surface of the solution L is held at a fixed level in the atomization chamber 11. The fixed level of the solution L is set at the height where the solution L can be efficiently atomized into mist when the solution L is ultrasonically vibrated by the ultrasonic vibrators 12. In order to hold the surface of the solution L at the fixed level, the inlet side of the atomization chamber 11 is connected through a pump 7 to a solution tank 6 that stores the solution L, and the outlet side of the atomization chamber 11 is also connected to the solution tank 6. The solution overflows from an outlet port of the atomization chamber 11, which is arranged on the outlet side, so that the surface of the solution is held at the fixed level. Alternatively, the surface level of the solution is detected by a level sensor while a predetermined amount of the solution is discharged from the outlet port, and the operation of the pump is controlled in accordance with the level that is detected by the level sensor so that the surface of the solution is held at the fixed level.

In the opened-loop type atomizing separation devices shown in FIGS. 1 to 3, 6 and 7, the solution is circulated between the solution tank 6 and the atomization chamber 11 while the surface of the solution in the atomization chamber 11 is held at the fixed level so that the solute concentration in the solution tank 6 and the atomization chamber 11 is increased. If the concentration in the atomization chamber 11 and the solution tank 6 reaches a predetermined concentration, the device discharges solution in both the atomization chamber 11 and the solution tank 6, and the atomization chamber 11 and the solution tank 6 are then filled with fresh solution to be condensed.

Figure 4:
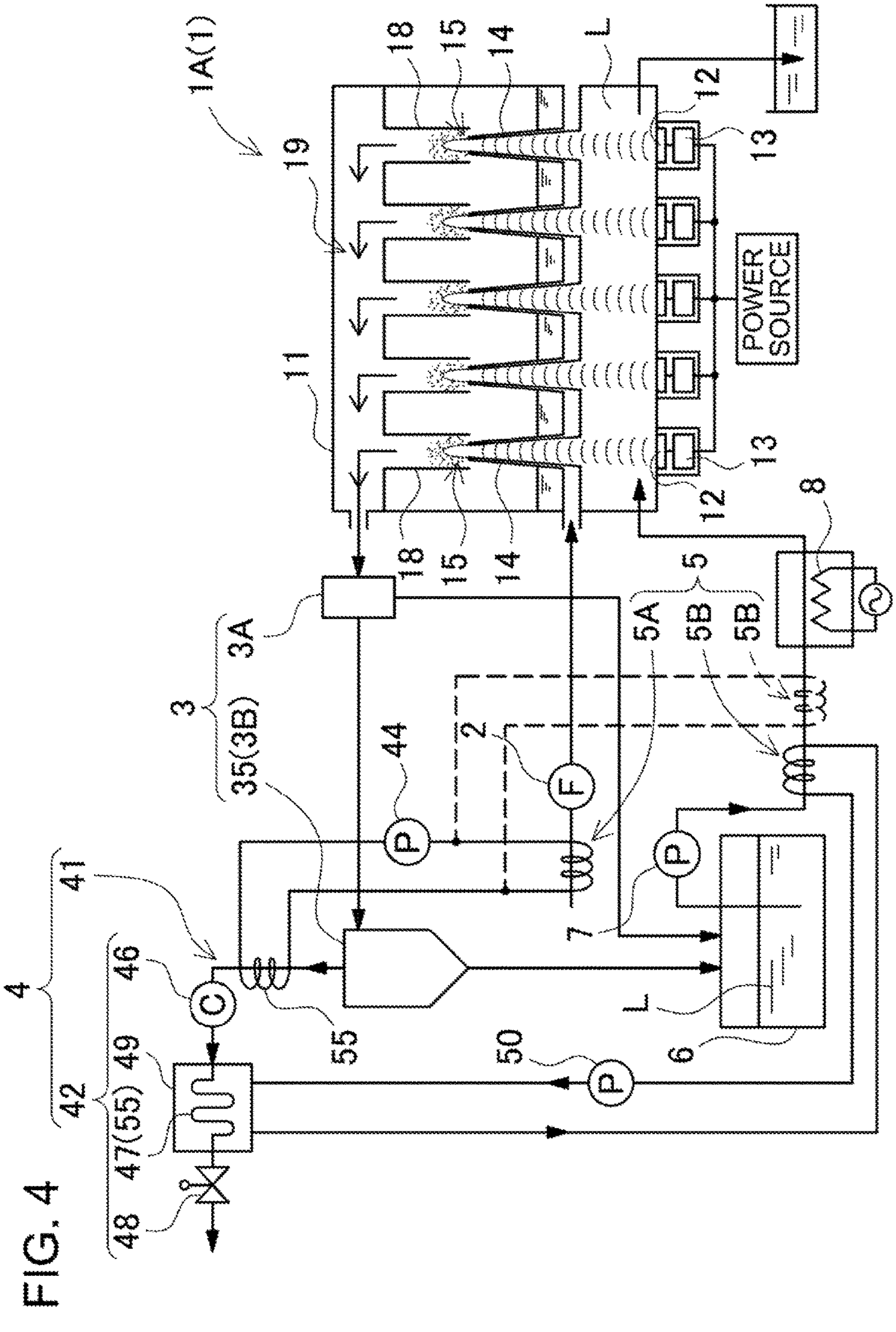
FIG. 4 is a schematic view showing the structure of an atomizing separation device according to another embodiment of the present invention.

In the opened-loop type atomizing separation device shown in FIG. 4, the solution that is supplied to the atomization chamber 11 is gradually condensed with slowly flowing from the inlet side toward the outlet side without circulation of the solution between the atomization chamber 11 and the solution tank 6. In this device, the supplied solution slowly flows from the inlet side toward the outlet side while the water component is removed from the solution, and the condensed solution is discharged from the outlet side. In this illustrated atomization chamber 11, the ultrasonic vibrators 12 are arranged side by side in the solution-flowing direction, that is, between the inlet side and the outlet side. In this atomization chamber 11, the solution supplied into the inlet side is atomized into mist in partitions of the atomization chamber 11 when slowly flowing toward the outlet side. Accordingly, water as the solvent is removed as the mist from the solution while the solution slowly flows from the inlet side toward outlet side so that the solution is condensed. After the solution passes through the ultrasonic vibrators 12, the concentration of the solution will reach a predetermined level, and the solution with the predetermined concentration level is discharged from the outlet side to the outside.

Figure 8:
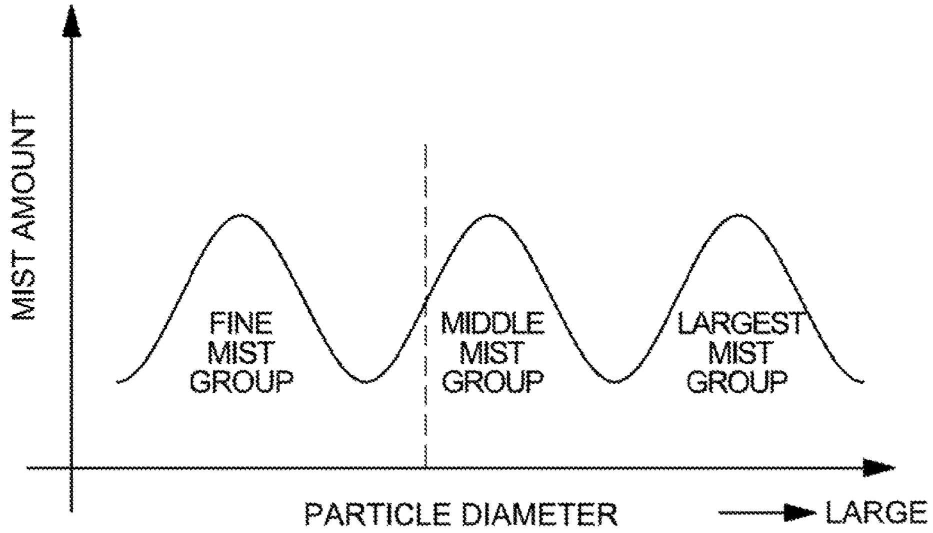
FIG. 8 is a graph showing the particle size distribution of mist dispersed in air.

The solution is ultrasonically vibrated by the ultrasonic vibrator 12, and is atomized into mist in air. The concentration of the mist droplets, which are produced by ultrasonic vibration, in the air varies in accordance with their particle diameters. Fine mist droplets with a small particle diameter have a solute concentration lower than larger mist droplets, and are mostly composed of the solvent. FIG. 8 is a graph showing the particle size distribution of mist dispersed in air by ultrasonic vibration. As shown in this graph, the distribution of atomized mist dispersed in air by ultrasonic vibration has three particle diameter ranges. As the particle diameter of mist droplets is smaller, their solute concentration becomes lower, and their solvent concentration becomes higher. Specifically, the smallest mist droplets which have several micrometers or smaller contain almost no solute, in other words, the most part of the smallest mist droplets is the solvent such as water. For this reason, the solution can be condensed by removing the solvent such as water component from the solution by separating fine mist droplets from the mist and exhausting the fine mist droplets together with air as the exhaust air to the outside. Since the solute component increases as the particle diameter of mist droplets is larger, large mist droplets are separated from the mist and fed back to the atomization chamber 11 so that removal of the solute component is prevented. Since the content of the solute is high in the largest and middle mist groups shown in FIG. 8 which have particle diameters of several micrometers or larger, the droplets in the largest and middle mist groups are fed as larger mist droplets back to the solution in the atomization chamber 11. On the other hand, the fine mist droplets which are mostly composed of the solvent component and have only a little solute component are exhausted as the exhaust air from the classifier 3 to the outside, and are removed from the solution.

When the solution is ultrasonically vibrated in the atomization chamber 11, a liquid protuberance P is produced and protrudes upward. The mist is dispersed into air from the surface of the liquid protuberance P. In the ultrasonic atomizers 1A shown in FIGS. 1 to 4, 6 and 7, the ultrasonic vibrators 12 are arranged side by side and orientated upward on the bottom of the atomization chamber 11, which is filled with the solution. The ultrasonic vibrator 12 emits ultrasonic waves upward from the bottom toward the surface of the solution, and vibrates the surface of the solution at an ultrasonic frequency, whereby producing the liquid protuberance P. The ultrasonic vibrator 12 emits ultrasonic waves in the vertical direction.

In the ultrasonic atomizers 1A shown in FIGS. 1 to 4, 6 and 7, conical members 14 are included which are arranged above the ultrasonic vibrators 12, in addition to the ultrasonic vibrators 12, the ultrasonic power source 13, which ultrasonically vibrates the ultrasonic vibrators 12. The ultrasonic vibrators 12 are watertightly fixed on the bottom of the atomization chamber 11.

The conical member 14 is arranged above the ultrasonic vibrator 12. The solution is ultrasonically vibrated by the ultrasonic vibrator 12, and is efficiently sprayed as mist from the conical member 14. The conical member 14 has a tapered sleeve shape (conical shape) having a spray opening 15 that is opened at its top end. In the illustrated ultrasonic atomizers 1A, the solution is supplied to the atomization chamber 11, and then supplied to the interior of the conical member 14. The solution supplied to the conical member 14 is subjected to ultrasonic vibration from the ultrasonic vibrator 12 toward the spray port 15, and is atomized into mist and dispersed through the spray opening 15. The illustrated ultrasonic vibrator 12 emits ultrasonic waves upward. To achieve this, the conical member 14 is fastened above the ultrasonic vibrator 12 in a vertical orientation.

In the atomizing separation devices shown in FIGS. 1 to 4, 6 and 7, the conical members 14 are arranged on the lower side of the atomization chamber 11. The conical members 14 are arranged above and spaced away from the bottom plate of the ultrasonic atomizer 1A on which the ultrasonic vibrators 12 are fastened. In the ultrasonic atomizer 1A, the ultrasonic vibration is guided from the ultrasonic vibrator 12, which is arranged under the lower end of the conical member 14, to the interior of the conical member 14 so that mist is dispersed through the spray opening 15, which is located at the upper end of the conical member 14. The conical members 14 are arranged on the common plane. The ultrasonic atomizer 1A sprays the solution that is supplied to the atomization chamber 11 into air from the spray openings 15 of the conical members 14 by using ultrasonic vibration.

The conical member 14 shown in FIGS. 1 to 4, 6 and 7 is a conical horn which is tapered toward the upper end. Alternatively, however, the conical member 14 can be an exponential horn which has an exponentially curved interior shape. The conical member 14 such as a conical horn or an exponential horn has an advantage that the ultrasonic vibration can be effectively transmitted inside the conical member so that the solution can be efficiently atomized into mist. However, it is noted that the conical member may be cylindrical, elliptical or polygonal.

Figure 9:
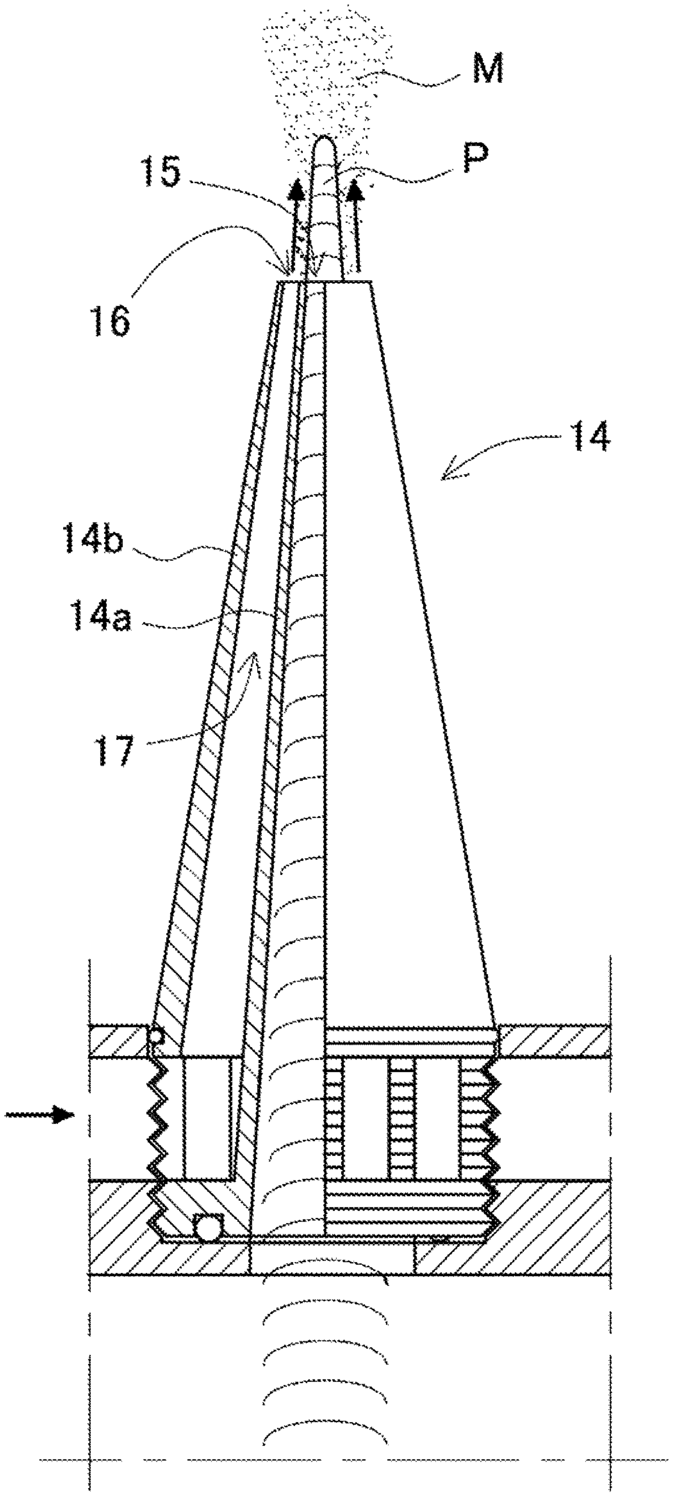
FIG. 9 is an enlarged cross-sectional front view showing an exemplary conical member.

After sprayed into the air from the spray openings 15 of the conical members 14, the mist is mixed with carrier gas of air so that mist-mixed air is produced and supplied to the classifier 3 from the atomization chamber 11. The conical member 14 has an air-discharging opening 16 that is arranged and opened around the spray opening 15, and discharges air as the carrier gas as shown in FIG. 9. The conical member 14 shown in FIG. 9 includes an inner conical portion 14*a*, and an outer conical portion 14*b* that is arranged outside the inner conical portion 14*a* so that a duct 17 for air as the carrier gas is provided between the inner and outer conical portions 14*a* and 14*b*. The duct 17 has the air-discharging opening 16, which is opened around the spray opening 15 of the upper end of the conical member 14, so that air as the carrier gas supplied to the duct 17 is discharged through the air-discharging opening 16. The air-discharging opening 16 is opened in a slit shape as viewed in section, in other words, in a narrow ring shape around the upper end of the conical member 14. The air-discharging opening 16 with the narrow ring shape discharged air in a ring shape. The solution protrudes in gas (air) that is discharged in a ring shape so that mist is produced from the surface of the solution protuberance and is dispersed into the air. Since fresh gas is supplied to the surface of the liquid protuberance P, which protrudes from the spray opening 15, by this conical member 14, mist M is efficiently produced from the surface of the liquid protuberance P. The reason is that the mist M is produced in the gas that has a small concentration of the solution. Although the ultrasonic atomizer 1A includes the conical member 14 for efficiently atomizing the solution, the ultrasonic atomizer does not necessarily include the conical member.

The ducts 17 of the conical members 14 are connected to the blower 2. Air as the carrier gas is supplied from the blower 2, and is then discharged through the air-discharging opening 16 so that the mist is sprayed into the discharged air, and the mist-mixed air is produced.

In the ultrasonic atomizers 1A shown in FIGS. 1 to 4, 6 and 7, suction ports 18 for mist-mixed air are arranged above the spray openings 15 of the conical members 14 in order to efficiently collect the mist-mixed air, which is sprayed from the upper end of the conical member 14, and discharge the mist-mixed air from the atomization chamber 11. The illustrated suction ports 18 are cylindrical pipes, and orientated in a vertical orientation above the conical members 14. The lower ends of the suction ports 18 of cylindrical pipes are positioned at the same height as the upper ends of the conical members 14, and the upper ends extend upward of the atomization chamber 11. Each of the illustrated suction ports 18 is positioned right above the upper end of the corresponding conical member 14. However, it is noted that the lower end of the suction port may lap the upper end of the conical member, or may be spaced upward away from the upper end of the conical member. Also, the opening on the lower end of the suction port 18 has a larger opening area than the spray opening 15 of the conical member 14 so that the mist-mixed air sprayed from the upper end of the conical member 14 can be collected without escaping from the suction port. The upper ends of the suction ports 18 are connected to a duct 19 in the upper part of the atomization chamber 11 so that the mist collected through the suction ports 18 is moved to the classifier 3 through the circulation duct 19.

Figure 5:
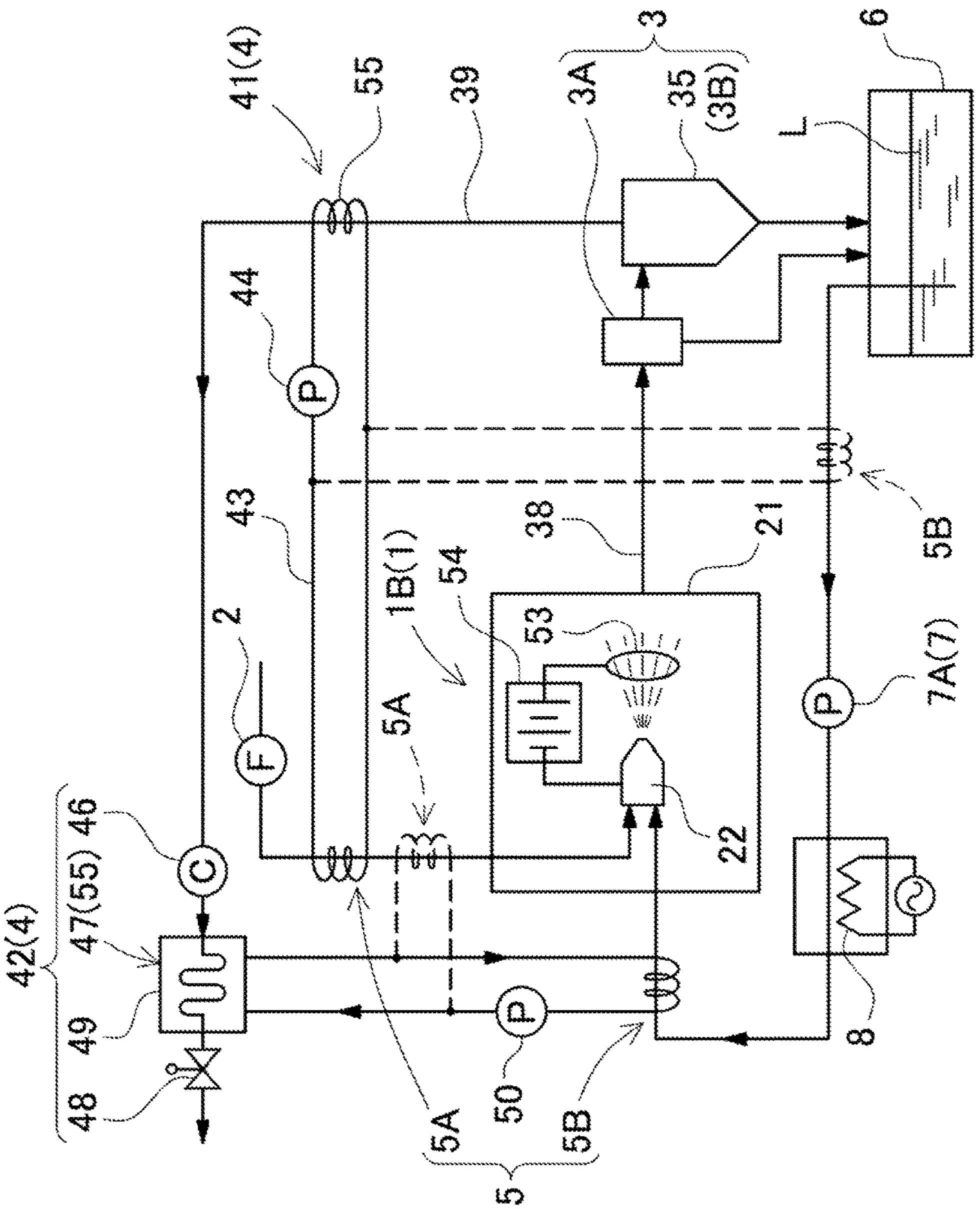
FIG. 5 is a schematic view showing the structure of an atomizing separation device according to another embodiment of the present invention.

In the atomizer 1B shown in FIG. 5, a spraying nozzle 22 is arranged inside an atomization chamber 21, and sprays the solution into air. In addition, a pressure pump 7A is connected to the spraying nozzle 22, and pressurizes the solution whereby supplying the solution to the spraying nozzle 22. Also, the blower 2 is connected to the atomization chamber 21, and supplies air to the atomization chamber 21. In the atomizer 1B, the spraying nozzle 22 sprays the solution into the air supplied by the blower 2 so that mist-mixed air is produced. The mist-mixed air flows to the classifier 3 through a pipe 38. In the illustrated atomizer 1B, the spraying nozzle 22 sprays only the solution into air whereby producing the mist-mixed air.

Figure 10:
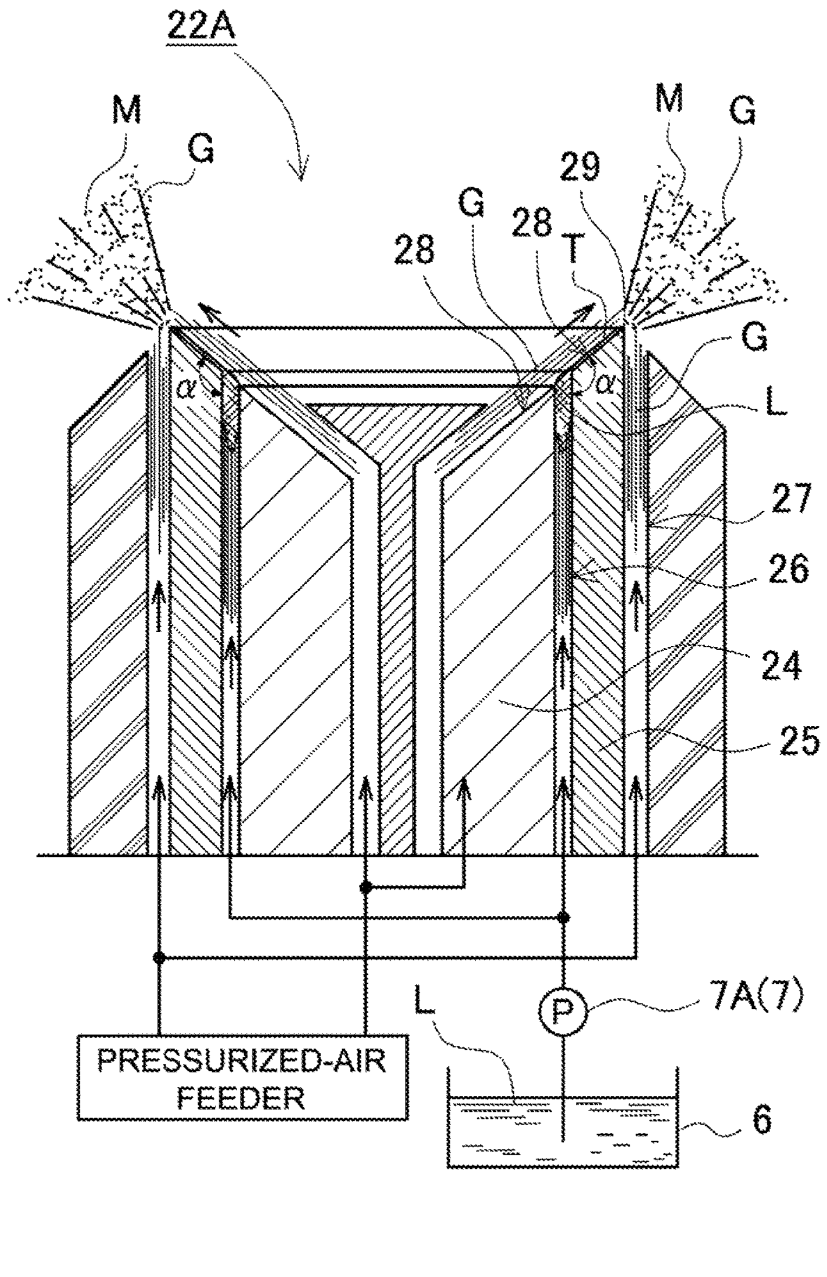
FIG. 10 is an enlarged cross-sectional view showing an exemplary two-fluid nozzle.

In the atomizer, a two-fluid nozzle can be used as the spraying nozzle. In this case, the solution and pressurized air are supplied to the two-fluid nozzle so that mist-mixed air can be discharged from the two-fluid nozzle. The two-fluid nozzle can pressurize both air and the solution when supplying the air and the solution, or only air whereby sucking the solution by using the air which flows at high speed so that mist-mixed air can be discharged. FIG. 10 shows an exemplary two-fluid nozzle 22A. The illustrated two-fluid nozzle 22A includes two cylindrical rings 24 and 25. The two cylindrical rings 24 and 25 have tapered end surfaces. The tapered end surfaces of two cylindrical rings 24 and 25 form a common conical surface as a smooth surface 28. A solution path 26 is formed in a ring shape having a predetermined width between the two cylindrical rings 24 and 25. In addition, an edge 29 is provided at the end of the smooth surface 28. The two-fluid nozzle 22A has an injection path 27 that extends along the smooth surface 28, and injects air G toward the edge 29. The solution L is discharged from the solution path 26, which is arranged at an intermediate position of the smooth surface 28 between the two cylindrical rings 24 and 25, and is then flown along the smooth surface 28 by the air G, which is injected from the injection path 27 toward the edge 29 along the smooth surface 28, so that the solution expand in the flow direction and becomes a thin film-shaped flow T. As a result, the thin film-shaped flow T is mixed with air G, and is discharged as the mist M from the edge 29 at the end of the smooth surface 28. Thus, the two-fluid nozzle 22A can discharge the solution and air as mist-mixed air.

The spraying nozzle 22, an atomization electrode 53, and a high-voltage power supply 54 are provided in the atomization chamber 21 of the atomizer 1B shown in FIG. 5. The spraying nozzle 22 atomizes the solution into mist. The atomization electrode 53 electrostatically changes the mist, which is discharged from the spraying nozzle 22, into fine droplets. The high-voltage power supply 54 is connected to the atomization electrode 53 and spraying nozzle 22, and applies high voltage between the atomization electrode 53 and the spraying nozzle 22 whereby changing the mist, which is discharged from the spraying nozzle 22, into fine droplets. In the atomizer 1B, the solution is discharged in the air from the spraying nozzle 22, and is atomized into mist by the atomization electrode 53.

The temperature of solution has an influence on the atomization efficiency of the solution. When the temperature of a solution is held at a predetermined temperature, the atomization efficiency can be high. In the opened atomizing separation devices shown in FIGS. 1 to 7, a heater 8 is provided for heating solution to the predetermined temperature. The heater 8 is an electric heater, or a heat exchanger which heats the solution by using a heating medium (e.g., heating steam, or warm water). In these illustrated devices, the heater 8 is provided at a midpoint of the pipe which supplies the solution to the atomization chamber 11 or 21. Although not illustrated, the heater can be provided inside the atomizer, and can heat the solution in the atomizer. For example, the solution can be preferably heated to a temperature not lower than 20° C., more preferably not lower than 25° C., and most preferably not lower than 30° C. by the heater 8. On the other hand, if the temperature of solution to be held by heating is high, the energy consumption by the heater 8 will be large. From this viewpoint, the solution can be preferably heated to a temperature not higher than 80° C., more preferably not higher than 70° C., and most preferably not higher than 50° C., for example. In the case where the temperature of solution is high, the solution can be atomized into mist at high atomization efficiency without the heater for heating the solution. For this reason, in the method and device according to the present invention, a heater is not necessarily provided for heating a solution.

In addition, the atomization efficiency of the solution can be high when the temperature of air as the carrier gas to be supplied to the atomizer 1 is heated to a predetermined temperature. In the devices shown in FIGS. 1 to 7, the exhaust heat of exhaust air that is exhausted from the classifier 3 is collected, and air as the carrier gas is heated by collected heat. In order to collect the exhaust heat of exhausted air, the exhaust-heat collector 4 is provided. The exhaust-heat-based heater 5 is also provided which heats air and solution by using the heat collected by the exhaust-heat collector 4.

The exhaust-heat collector 4 collects not only the sensible heat but also the latent heat from the exhaust air which contains fine mist that is exhausted from the classifier 3. The temperature of the exhaust air decreases when the sensible heat is collected. The sensible heat can be collected by a heat exchanger 55. Since the exhaust air contains an evaporated gas component of mist, the heat of condensation is generated by liquefying the evaporated component of the mist. This heat of condensation can be collected as the latent heat of the exhaust air. The heat energy of the latent heat that is collected by condensing the evaporated component included in mist is substantially large as compared with the sensible heat included in the exhaust air. For this reason, a very large amount of heat energy can be collected by collecting not only the sensible heat but also the latent heat from the exhaust air. In order to collect the heat of condensation as the latent heat from the evaporated component included in the exhaust air, it is necessary to liquefy the evaporated component included in the exhaust air so that the heat of condensation is generated. The exhaust-heat collector 4 includes a latent-heat collector 42 that forcedly cools the exhaust air and collects the heat of condensation as the latent heat. In the atomizing separation devices shown in FIGS. 1 to 7, after the classifier 3 classifies mist into fine mist droplets and larger mist droplets, the exhaust heat of both the sensible heat and the latent heat is collected from the exhaust air that contains the fine mist droplets when the exhaust air is exhausted to the outside.

The exhaust-heat collector 4 includes a sensible-heat collector 41 in addition to the latent-heat collector 42. The sensible-heat collector 41 collects the sensible heat of the exhaust air which is exhausted from the classifier 3. The latent-heat collector 42 collects the latent heat of the exhaust air. In the atomizing separation devices shown in FIGS. 1 and 2, the exhaust-heat collector 4 is provided which collects both the sensible heat and the latent heat. In the atomizing separation devices shown in FIGS. 3 to 5, the sensible-heat collector 41 and the latent-heat collector 42 are provided.

Figure 2:
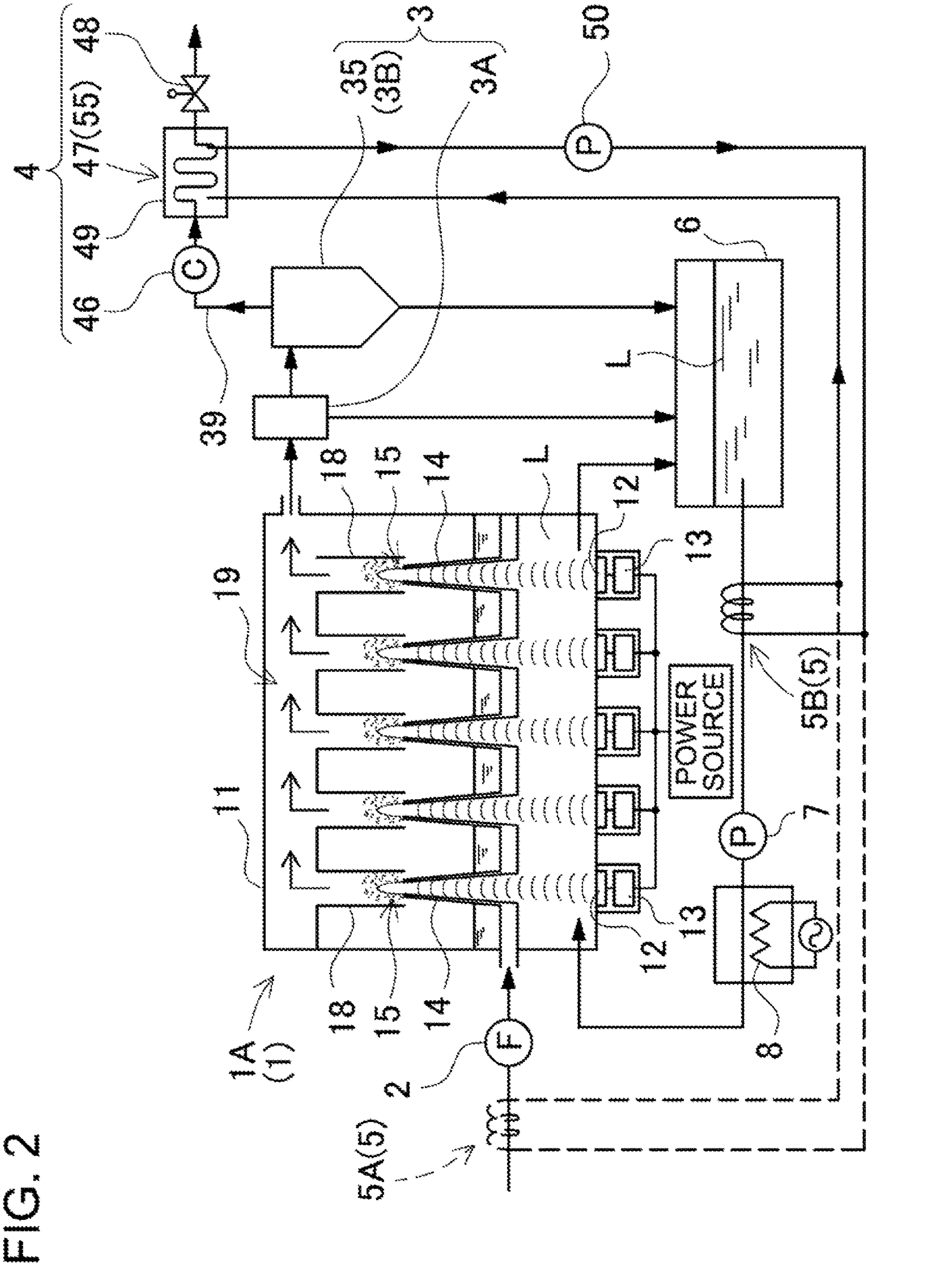
FIG. 2 is a schematic view showing the structure of an atomizing separation device according to another embodiment of the present invention.

In the atomizing separation devices shown FIGS. 1 and 2, both of the sensible heat and latent heat of the exhaust air are collected by the heat-pump type exhaust-heat collector 4. The exhaust-heat collector 4 shown in FIG. 1 includes an evaporator 56 that collects both of the sensible heat and latent heat from the exhaust air. The evaporator 56 evaporates a circulated refrigerant that passes through the evaporator 56 by using the heat energy of exhaust air that is discharged from the classifier 3 so that the exhaust air is forcedly cooled by providing the heat of vaporization of the refrigerant. As a result, both of the sensible heat and the latent heat can be collected which are included in the exhaust air. Thus, in this illustrated atomizing separation device, the heat energy of both the sensible heat and the latent heat is collected by the exhaust-heat collector 4.

The exhaust-heat collector 4 shown in FIG. 1 includes the evaporator 56, a compressor 57, a second condenser 58, an expansion valve 59, and a circulation path 60. The evaporator 56 supplies heat energy to a circulated refrigerant by using the heat energy of the exhaust air, which is exhausted from the classifier 3, so that the refrigerant can be evaporated. The compressor 57 pressurizes the refrigerant gas that is discharged from the evaporator 56. The second condenser 58 cools and liquefies the refrigerant gas that is discharged from the compressor 57, and can generate the heat of condensation. The expansion valve 59 is connected between the second condenser 58 and the evaporator 56. The refrigerant is circulated through the circulation path 60. The second condenser 58 can serve as the exhaust-heat-based heater 5. In the heat-pump type exhaust-heat collector 4, the refrigerant is evaporated by the evaporator 56. The evaporated refrigerant gas is pressurized by the compressor 57. The pressurized refrigerant gas is liquefied by the second condenser 58. The liquefied refrigerant is fed back to the evaporator 56, and is evaporated by the evaporator 56. Thus, the refrigerant is circulated. That is, the refrigerant is circulated along the circulation path 60 from the evaporator 56 through the compressor 57, the second condenser 58 and the expansion valve 59 back to the evaporator 56. The evaporator 56 removes heat energy from the exhaust air, and evaporates the refrigerant by using the removed heat energy. The exhaust air is cooled when the heat of vaporization is removed from the exhaust air so that the evaporated component in the exhaust air liquefies. When liquefied, the evaporated component generates the heat of condensation. The heat of condensation is used for the heat energy for evaporating the refrigerant. The evaporator 56 collects both the sensible heat and the latent heat when the exhaust air is cooled. The second condenser 58 liquefies the evaporated refrigerant, in other words, condenses the evaporated refrigerant so that the heat of condensation is generated. The second condenser 58 is used as the exhaust-heat-based heater 5, and heats both the solution to be supplied to the atomizer 1 and air to be supplied to the atomizer 1 by using the heat of condensation of the refrigerant. However, it is noted that the atomizing separation device may heat only one of the solution and air to be supplied to the atomizer by using the heat energy that is collected by the exhaust-heat collector.

The heat-pump exhaust-heat collector 4 of the atomizing separation device shown in FIG. 2 includes a compressor 46, a condenser 47, and an expansion valve 48. The compressor 46 pressurizes the exhaust air that is exhausted from the classifier 3. The condenser 47 condenses the vaporized component that is included in the exhaust air, which is pressurized by the compressor 46. The expansion valve 48 is connected to the exhaust side of the condenser 47. In the exhaust-heat collector 4, the exhaust air is pressurized inside the condenser 47 so that the boiling point of the solvent such as water becomes higher. The exhaust air that contains the solvent with higher boiling point liquefies the solvent that is evaporated at a temperature lower than its boiling point so that the heat of condensation corresponding to the heat of vaporization of the solvent is generated. The heat of condensation that is generated in the condenser 47 is collection heat that is collected as the latent heat of the exhaust air. The solution and air to be supplied to the atomizer 1 are heated by using this collection heat.

The condenser 47 of the exhaust-heat collector 4 shown in FIG. 2 is the heat exchanger 55 in which a pipe for exhausting the exhaust air is watertightly arranged in a sealed case 49 that is filled with the heating medium such as water. The heating medium of the condenser 47 is heated by using the heat of condensation of the exhaust air that is condensed in the pipe. Since the heating medium is heated with the heat of condensation of the exhaust air, the heat energy of the exhaust air can be collected. The heating medium that has heated by collecting heat energy, that is, the heating medium that is heated with the collection heat is fed to the exhaust-heat-based heater 5 by a circulating pump 50. The exhaust-heat-based heater 5 heats the solution to be supplied to the atomizer 1 with the heating medium that is heated with the collection heat. Although the solution to be supplied to the atomizer 1 is heated by the exhaust-heat-based heater 5 in the illustrated atomizing separation device, air to be supplied to the atomizer 1 may be heated as shown by the dashed line in FIG. 2.

Figure 3:
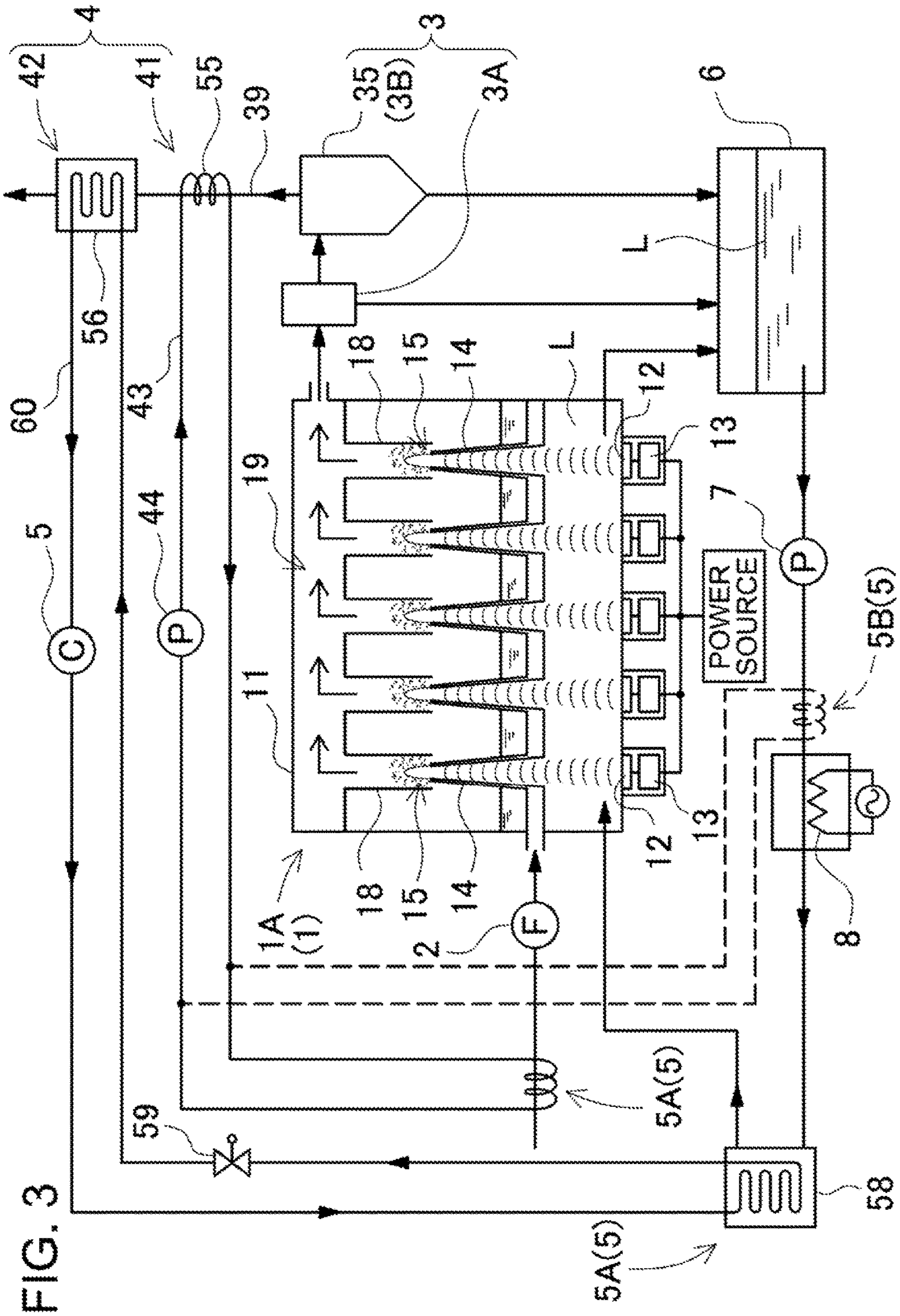
FIG. 3 is a schematic view showing the structure of an atomizing separation device according to another embodiment of the present invention.

In the atomizing separation devices shown in FIGS. 3 to 5, both the sensible-heat collector 41 and the latent-heat collector 42 are provided. The sensible-heat collector 41 includes the heat exchanger 55, which collects the sensible heat of the exhaust air through a decrease in temperature of the exhaust air. In the heat exchanger 55, a circulation path 43 for circulating a circulation fluid is arranged with the circulation path being thermally coupled to an exhaust path 39 for exhaust air. Exhaust air to be exhausted flows through the exhaust path 39 of the sensible-heat collector 41, which is the heat exchanger 55. The circulation fluid in a liquid or gas state is circulated by a circulating pump 44 through the circulation path 43. In this sensible-heat collector 41, heat is conducted from the exhaust path 39 to the circulation path 43 so that the circulation fluid in the circulation path 43 can be heated with the exhaust heat of the exhaust air. That is, the sensible heat of the exhaust air can be collected by heating the circulation fluid with the sensible heat of the exhaust air. When the circulation fluid passes through the exhaust-heat-based heater 5 in the circulation, the exhaust-heat-based heater 5 is supplied with the collected heat. After that, the latent-heat collector 42 collects the latent heat of the exhaust air from which the sensible heat has been removed.

In the atomizing separation devices shown in FIGS. 3 to 5, air to be supplied to the atomizer 1 is heated by using the sensible heat of the exhaust air that is collected by the sensible-heat collector 41. To achieve this, the sensible-heat collector 41 is coupled to the exhaust-heat-based air heater 5A, and supplies the collected heat to the exhaust-heat-based air heater 5A. Although air to be supplied to the atomizer 1 is heated with the collection heat collected by the sensible-heat collector 41 in the aforementioned atomizing separation devices, the solution to be supplied to the atomizer 1 may be heated with this collection heat as shown by the dashed lines in FIGS. 3 to 5.

Figure 6:
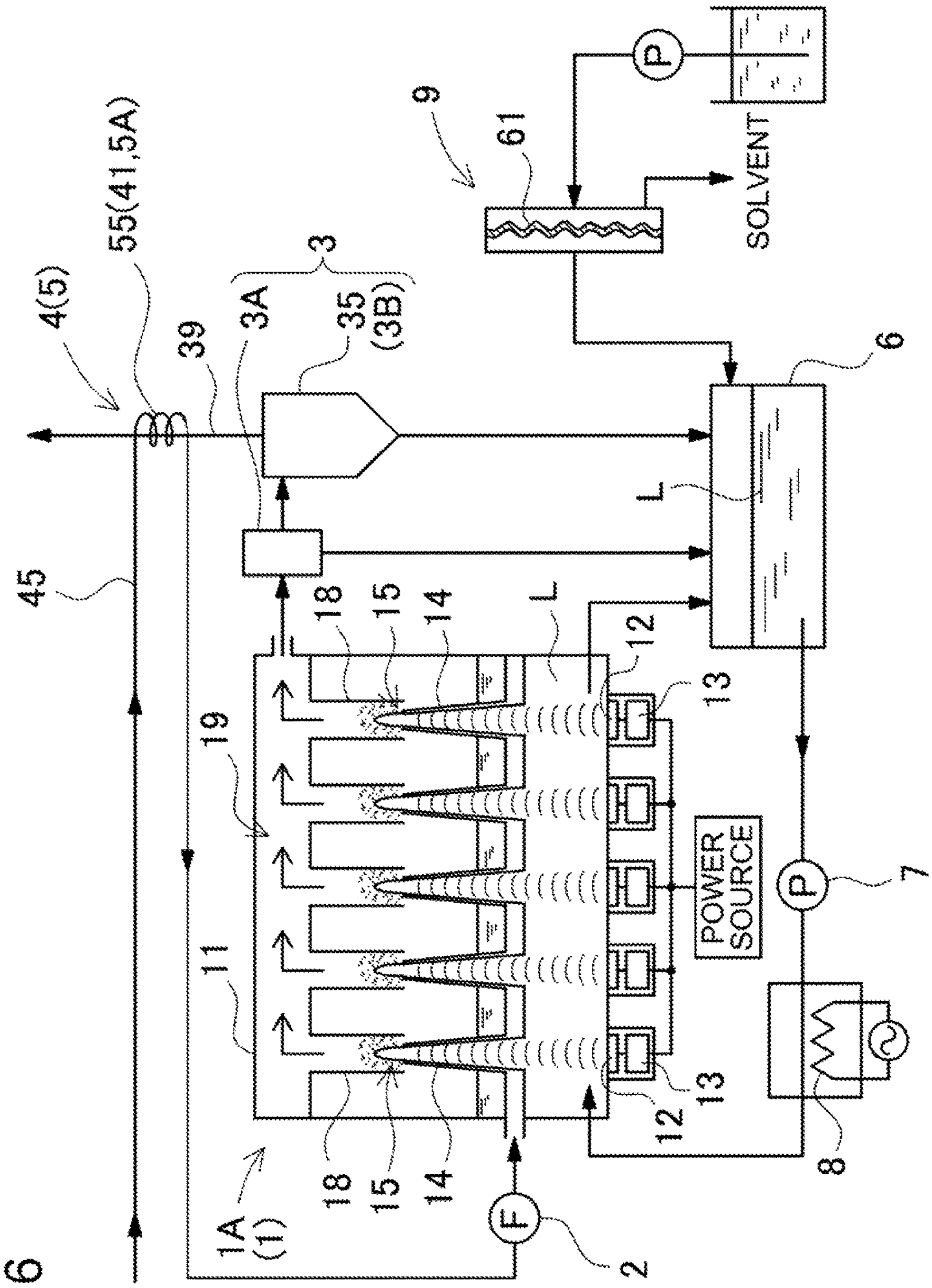
FIG. 6 is a schematic view showing the structure of an atomizing separation device according to another embodiment of the present invention.
Figure 7:
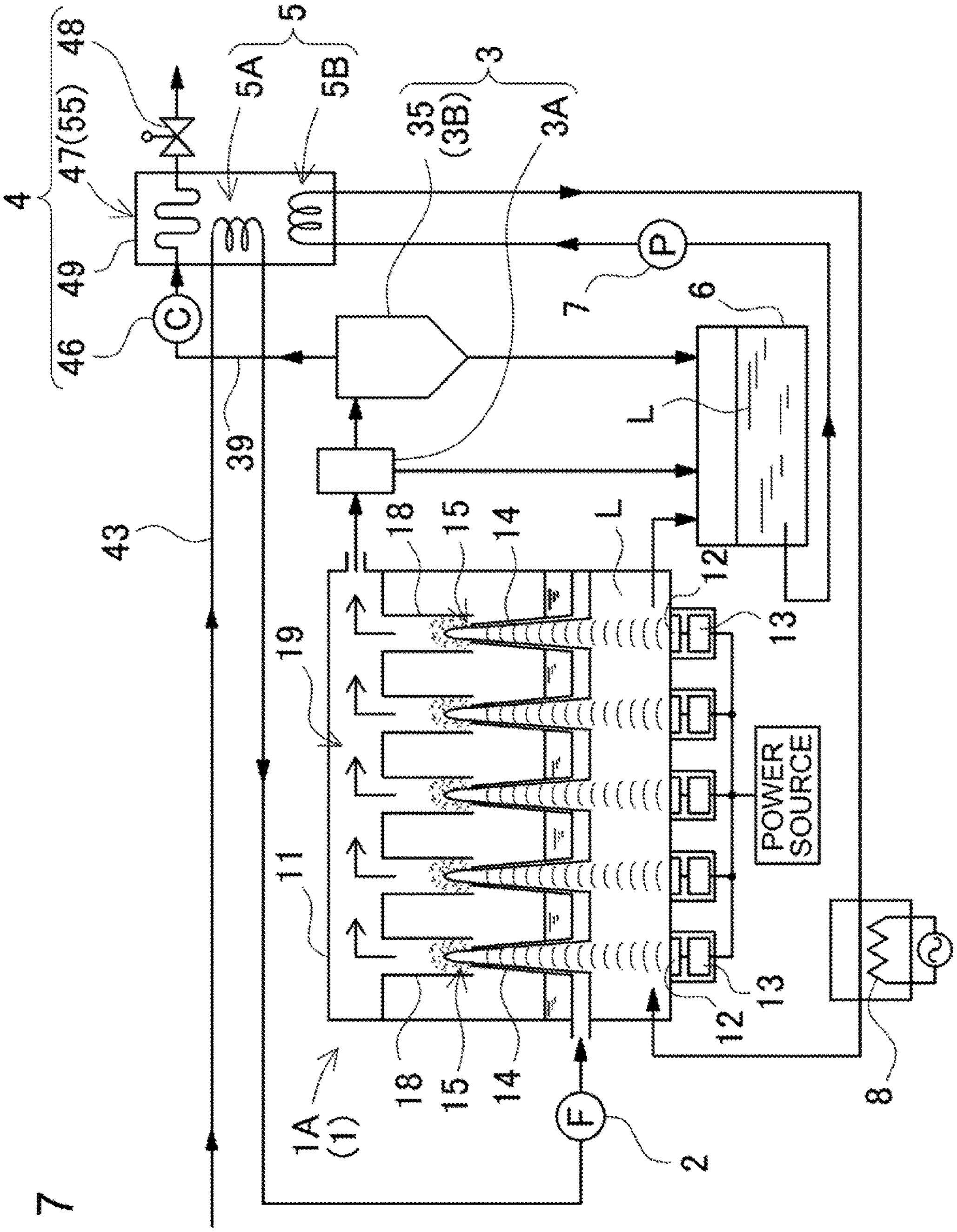
FIG. 7 is a schematic view showing the structure of an atomizing separation device according to still another embodiment of the present invention.

As shown in the atomizing separation device of FIG. 6 (it is noted that the latent-heat collector is omitted in FIG. 6), the sensible-heat collector 41 and the exhaust-heat-based air heater 5A can be constructed integrally with each other as the heat exchanger 55. In this heat exchanger 55, an air path 45 for flowing air to be supplied to the atomizer 1 is arranged with the air path 45 being thermally coupled to the exhaust path 39 for exhaust air. In this heat exchanger 55, exhaust air to be exhausted flows through the exhaust path 39, while air to be supplied to the atomizer 1 flows through the air path 45. In this heat exchanger 55, heat is conducted from the exhaust path 39 to the air path 45 so that air in the air path 45 can be heated with the sensible heat of the exhaust air. After that, although not illustrated, the latent-heat collector collects the latent heat of the exhaust air from which the sensible heat has been removed by the heat exchanger 55.

The latent-heat collector 42 collects the latent heat of the exhaust air that is exhaust from the classifier 3. In the exhaust-heat collector 4, after the sensible heat of the exhaust air is collected by the heat exchanger 55, the heat-pump-type latent-heat-collector 42 collects the latent heat of the exhaust air which passes through the heat exchanger 55. The compressor 46, the condenser 47, and the expansion valve 48 are provided in the heat-pump latent-heat collector 42 in the atomizing separation devices shown in FIGS. 4 and 5. The compressor 46 pressurizes the exhaust air that is exhausted from the classifier 3. The condenser 47 condenses the vaporized component that is included in the exhaust air, which is pressurized by the compressor 46. The expansion valve 48 is connected to the exhaust side of the condenser 47. In the latent-heat collector 42, the exhaust air is pressurized inside the condenser 47 so that the boiling point of the solvent such as water becomes higher. The exhaust air that has higher boiling point liquefies the solvent that is evaporated at a temperature lower than its boiling point so that the heat of condensation corresponding to the heat of vaporization of the solvent is generated. The heat of condensation that is generated in the condenser 47 is collection heat that is collected as the latent heat of the exhaust air. The solution and air to be supplied to the atomizer 1 are heated by using this collection heat.

The condenser 47 of the latent-heat collector 42 is the heat exchanger 55 in which the pipe for exhausting the exhaust air is watertightly arranged in the sealed case 49 that is filled with the heating medium such as water. The heating medium of the condenser 47 is heated by using the heat of condensation of the exhaust air that is condensed in the pipe. The heating medium is heated with the latent heat of the exhaust air of the exhaust air so that the latent heat of the exhaust air is collected. The heating medium that has heated by collecting the latent heat, that is, the heating medium that is heated with the collection heat is fed to the exhaust-heat-based heater 5 by the circulating pump 50. The exhaust-heat-based heater 5 heats the solution to be supplied to the atomizer 1 with the heating medium that is heated with the collection heat.

In the atomizing separation device shown in FIG. 3, after the sensible heat of the exhaust air is collected by the sensible-heat collector 41 of the heat exchanger 55, the heat pump latent-heat collector 42 collects the latent heat of the exhaust air that is exhausted from the heat exchanger 55 of the sensible-heat collector 41. The latent-heat collector 42 includes the evaporator 56, the compressor 57, the second condenser 58, the expansion valve 59, and the circulation path 60. The evaporator 56 supplies heat energy to a refrigerant to be circulated by using the heat energy of the exhaust air, which is exhausted from the classifier 3, so that the refrigerant can be evaporated. The compressor 57 pressurizes the refrigerant gas that is discharged from the evaporator 56. The second condenser 58 cools and liquefies the refrigerant gas that is discharged from the compressor 57, and can generate the heat of condensation. The expansion valve 59 is connected between the second condenser 58 and the evaporator 56. The refrigerant is circulated through the circulation path 60. The second condenser 58 can serve as the exhaust-heat-based heater 5. In the heat-pump type latent-heat collector 42, the refrigerant is evaporated by the evaporator 56. The evaporated refrigerant gas is pressurized by the compressor 57. The pressurized refrigerant gas is liquefied by the second condenser 58. The liquefied refrigerant is fed back to the evaporator 56, and is evaporated by the evaporator 56. Thus, the refrigerant is circulated. That is, the refrigerant is circulated along the circulation path 60 from the evaporator 56 through the compressor 57, the second condenser 58 and the expansion valve 59 back to the evaporator 56. The evaporator 56 removes heat energy from the exhaust air, and evaporates the refrigerant by using the removed heat energy. The exhaust air is cooled when the heat of vaporization is removed from the exhaust air so that the evaporated component in the exhaust air liquefies. When liquefied, the evaporated component generates the heat of condensation. The heat of condensation is used for the heat energy for evaporating the refrigerant. The evaporator 56 collects the latent heat when the exhaust air is cooled. The second condenser 58 liquefies the evaporated refrigerant, in other words, condenses the evaporated refrigerant so that the heat of condensation is generated. The second condenser 58 is used as the exhaust-heat-based heater 5, and heats the solution to be supplied to the atomizer 1 by using the heat of condensation of the refrigerant.

In the atomizing separation devices shown in FIGS. 3 to 5, the latent heat of the exhaust air is collected by the latent-heat collector 42, and the collected latent heat is supplied as the collection heat to the exhaust-heat-based solution heater 5B. The exhaust-heat-based solution heater 5B heats the solution to be the atomizer 1 whereby improving the atomization efficiency. Although the solution to be the atomizer 1 is heated with the collection heat in the aforementioned atomizing separation devices, air to be supplied to the atomizer 1 may be heated with this collection heat as shown by the dashed lines in FIGS. 3 to 5.

The exhaust-heat-based heater 5 includes the exhaust-heat-based air heater 5A, and the exhaust-heat-based solution heater 5B. The exhaust-heat-based air heater 5A heats the air to be supplied to the atomizer 1. The exhaust-heat-based solution heater 5B heats the solution that is supplied to the atomizer 1. In the atomizing separation devices shown in FIGS. 1 to 5, both the exhaust-heat-based air heater 5A and the exhaust-heat-based solution heater 5B are provided. In these atomizing separation devices, the exhaust-heat-based air heater 5A is supplied with the collection heat of the sensible heat that is collected by the sensible-heat collector 41, and heats air to be supplied to the atomizer 1, while the exhaust-heat-based solution heater 5B is supplied with the collection heat of the latent heat that is collected by the latent-heat collector 42, and heats the solution to be supplied to the atomizer 1.

In the atomizing separation devices of the present invention, the solution to be supplied to the atomizer 1 may be heated with the collection heat of the sensible heat that is collected by the sensible-heat collector 41, while air to be supplied to the atomizer 1 may be heated with the collection heat of the latent heat that is collected by the latent-heat collector 42 as shown by the dashed lines in Figures. Also, in the atomizers shown in FIGS. 1 to 4 and 6, the solution in the atomization chamber may be heated by the exhaust-heat-based solution heater.

Although the latent-heat collector 42 and the exhaust-heat-based solution heater 5B are separately provided, and the collection heat that is collected by the latent-heat collector 42 is supplied to the exhaust-heat-based solution heater 5B so that the solution for the atomizer 1 is heated in the atomizing separation devices shown in FIGS. 2 to 5, the exhaust-heat collector 4 and the exhaust-heat-based heater 5 may be constructed integrally with each other. In the atomizing separation device shown in FIG. 7, the solution and air to be supplied to the atomizer 1 flow inside the sealed case 49 of the condenser 47 of the exhaust-heat collector 4 so that the solution and air are heated with the heat energy of both of the latent heat and sensible heat of the exhaust air. According to this construction, the solution and air to be supplied to the atomizer 1 can be more efficiently heated with the collection heat from the exhaust air.

In the atomizing separation device shown in FIG. 6, after the solution to be supplied to the atomizer 1 is filtered by a filter mechanism 9 that includes a reverse osmotic membrane 61, a part of solvent included in the solution is removed so that the solution from which the part of solvent has been removed can be condensed. In the filter mechanism 9, the solution is pressurized and passed through the reverse osmotic membrane 61 so that a part of solvent is separated and removed from the solution. The reverse osmotic membrane 61 is a filter through which the solvent is passed but the solute cannot be passed. The solvent can be separated from the solution by pressurizing the solution to be supplied to the reverse osmotic membrane 61. In this atomizing separation device, since the solution is condensed by atomizing the solution into mist after a part of solvent is removed from the solution by the filter mechanism 9, the solution can be condensed to a higher concentration.

When supplied from the atomizer 1 with mist droplets that are included in the mist-mixed air, the classifier 3 classifies the mist droplets into particle size groups according to their particle diameters. The atomizer 1 sprays the mist into the air whereby producing mist-mixed air. As a result, the mist is supplied together with air as carrier gas to the classifier 3. In the atomizing separation devices shown in FIGS. 1 to 7, outside air is drawn by the blower 2, and supplied to the atomizer 1. After that, the mist-mixed air is produced by the atomizer 1, and supplied to the classifier 3. In the illustrated atomizing separation devices, the blower 2 is coupled to the inlet side of the atomizer 1. However, it is noted that the blower may be coupled between the atomizer and the classifier, or on the outlet side of the classifier for suppling the mist-mixed air from the atomizer to the classifier. In the case where the blower is provided between the atomizer and the classifier, the blower sucks the mist-mixed air from the atomizer, and forcedly blows it toward the classifier. Outside air is drawn to the atomizer, which has a closed structure, when this blower sucks the mist-mixed air from the atomizer. In the case where the atomizing separation device includes the blower which is coupled to the outlet side of the classifier, the classifier has a closed structure and forcedly discharges the mist-mixed air so that the mist-mixed air is sucked from the atomizer to the classifier. As a result, suction of the mist-mixed air from the atomizer to the classifier allows the atomizer 1 to suck outside air.

When supplied from the atomizer 1 with mist droplets that are included in the mist-mixed air, the classifier 3 classifies the mist droplets into particle size groups according to their particle diameters. In the atomizing separation device shown in FIG. 1 to FIG. 7, the classifier 3 includes first and second classifiers 3A and 3B that are coupled in series to each other. This classifier 3 has two stages, that is, first and second separation steps for classifying the mist droplets into particle size groups. The mist droplets can be classified into three particle diameter ranges of largest, middle and smallest diameter ranges by the first and second classifiers 3A and 3B, which are coupled in series to each other. Largest mist droplets having largest particle diameters as a largest particle size group are distributed in the largest diameter range.

Middle mist droplets having middle particle diameters as a middle particle size group are distributed in the middle diameter range. Fine mist droplets having smallest particle diameters as a smallest particle size group are distributed in the smallest diameter range. The second classifier 3B is supplied with the mist-mixed air from which the largest mist droplets have been removed by the first classifier 3A. The first classifier 3A separates the largest mist droplets which have particle diameters of the order of millimeters or greater from the air so that the largest mist droplets are fed back to the solution. The second classifier 3B separates the middle mist droplets which have particle diameters of several micrometers or larger from the air so that the middle mist droplets are fed back to the solution while the fine mist droplets which have particle diameters smaller than several micrometers are not separated from the air and discharged as exhaust air to the outside.

Figure 11:
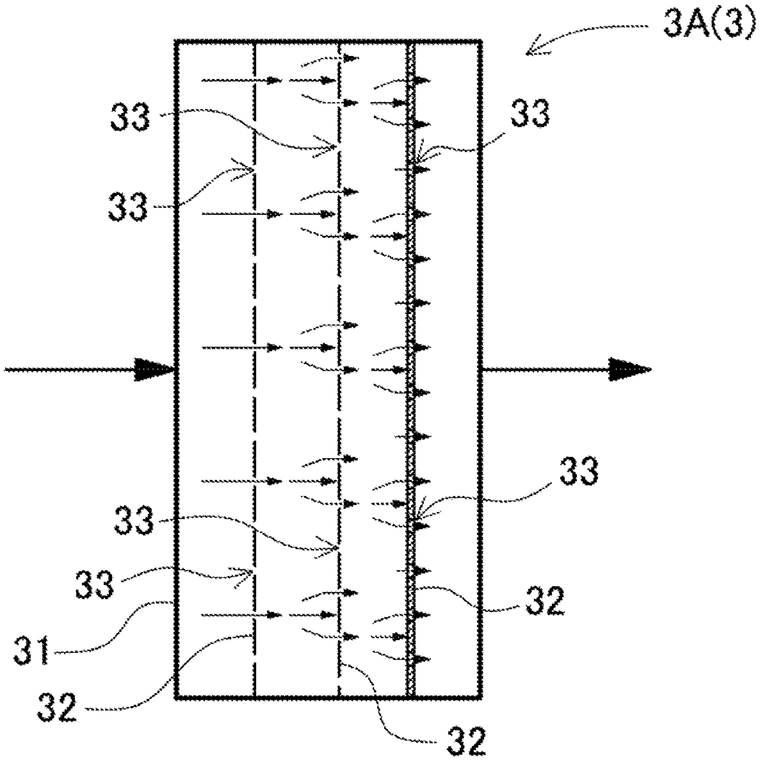
FIG. 11 is a schematic view showing the structure of a first classifier.

FIG. 11 shows the sectional shape of the first classifier 3A. This illustrated first classifier 3A includes a closed case 31, and a plurality of perforated plates 32. The mist-mixed air can pass through the closed case 31. The perforated plates 32 are arranged in the closed case 31, and spaced away from each other in the flowing direction of mist-mixed air. When the mist-mixed air passes through the perforated plate 32 in this classifier 3, the largest mist droplets (see FIG. 8) are attached onto the surfaces of the perforated plates 32, and removed from the mist-mixed air. The middle and fine mist droplets (see FIG. 8) are not attached onto the surfaces of the perforated plates 32 and pass through the perforated plate 32 so that the second classifier 3B is supplied with the middle and fine mist droplets together with air. The mist droplets that are attached onto the perforated plates 32 flow down along the perforated plates 32, and are fed back into the solution in the atomizer 1.

The perforated plates 32 face each other in the closed case 31. The perforated plates are spaced at a predetermined interval away from each other, and arranged in a vertical orientation. The perforated plates 32 have through holes 33. The through holes 33 of one of the perforated plates 32 are arranged at vertical positions that are deviated from the vertical positions of the through holes 33 of another perforated plated 32 that is arranged adjacent to the one of the perforated plates 32 so that the air collides with the surface of the perforated plate 32 on the exhaust side if traveling in a straight line when passing through the through holes 33 of the perforated plate 32 on the inlet side. According to the thus-constructed first classifier 3A, when passing through the through holes 33 of the perforated plate 32 on the inlet side, the largest mist droplets can be efficiently brought into collision with the surface of the perforated plate 32 on the outlet side so that the largest mist droplets can be efficiently attached to the surfaces of the perforated plates 32 on the outlet side.

Figure 12:
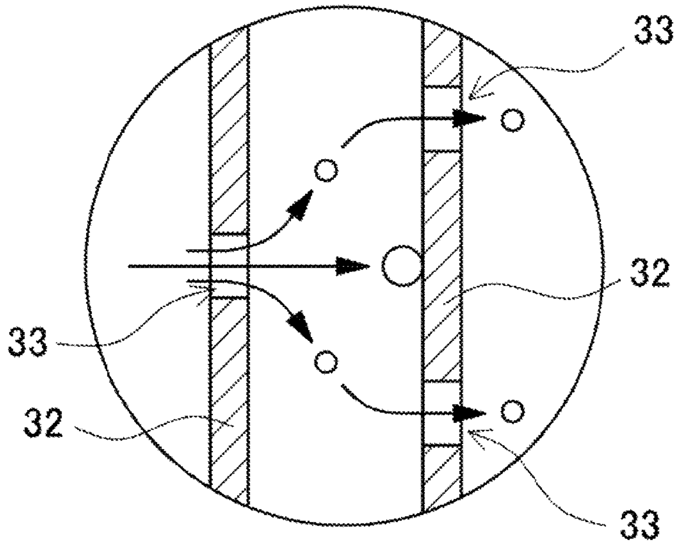
FIG. 12 is an enlarged cross-sectional view showing the movement of larger and fine mist droplets carried in air.

FIG. 12 shows the movement of a largest mist droplet as a larger mist droplet and fine mist droplets carried in the air. As shown in FIG. 12, since the fine mist droplets are small in weight, they can turn in traverse directions (in the directions perpendicular to the straight line) and moves together with the air. On the other hand, since the larger mist droplets in the mist-mixed air are heavy, and their inertia is large, they moves in the straight lines without turning in traverse directions, and collide with the surface of the perforated plate 32 on the exhaust side after passing the through holes 33 of the perforated plate 32 on the inlet side. As a result, the larger mist droplets can be collected. In the case where the classifier 3 collects the larger mist droplets by bringing the larger mist droplets into collision with the surface of the perforated plate 32 and passing the fine mist droplets through the perforated plate 32 without collision so that the fine mist droplets are discharged together with the air to the outside as shown in FIG. 12, when the flow rate of the mist-mixed air that passes through the perforated plate 32 is not greater than 0.5 m/sec, the larger mist droplets can be efficiently collected by the classification. The reason that if the flow rate of the mist-mixed air is too large, air as carrier gas will have a large amount of energy for carrying mist, and the larger mist droplets cannot be efficiently collected by the classification. Since the fine mist droplets are light, they can turn in traverse directions together with the air, and then flow through the through holes 33 of the perforated plates 32. Subsequently, the fine mist droplets are supplied to the second classifier 3B.

The first classifier 3A shown in the cross-sectional view of FIG. 11 includes two perforated plates 32 on the inlet side, and one perforated plate 32 on the exhaust side. The perforated plates 32 on the inlet side are constructed of meshed nets. The perforated plate 32 on the exhaust side has a large number of through holes. The steel perforated plates 32 of meshed nets have mesh openings as the through holes 33. The large number of through holes of the perforated plate 32 on the exhaust side also serve as the through holes 33. For example, the pitch of the meshed net, and the inner diameter and pitch of the through holes can be dimensioned 1 to 5 mm. In the case where the openings of the meshed net are smaller than the through holes of the perforated plate on the exhaust side, the flow resistance of the mist-mixed air can be large. The flow rate of mist-mixed air can be reduced to 0.5 m/sec or smaller by increasing the flow resistance. According to this classifier 3, since the mist-mixed air can be slowed down to a preferable flow rate, and the openings 33 of the meshed net are arranged at different positions deviated from the through holes 33 of the perforated plate on the exhaust side, the larger mist droplets can be efficiently collected and fed back to the solution. The first classifier 3A separates the largest mist droplets which have a high solute concentration from the air so that the largest mist droplets are fed back to the solution in the atomizer 1.

The second classifier 3B collects the middle mist droplets which are not collected by the first classifier 3A, and but does not collect the fine mist droplets whereby discharging air that contains the fine mist droplets as the exhaust air to the outside. The second classifier 3B is a cyclone classifier 35 which collects the middle mist droplets, and but does not separate the fine mist droplets from the mist-mixed air whereby discharging air that contains the fine mist droplets as the exhaust air to the outside. The cyclone classifier 35 has a funnel shape, which is obtained by coupling a cone to the bottom of a cylinder. The mist-mixed air flows into the upper part of the cylinder in the tangential direction to the circle of the cylinder. When flowing into the upper part of the cylinder, the mist-mixed air moves in a spiral inside the cylinder. The mist droplets also move in a spiral together with air in the spirally moving mist-mixed air. In the spiral movement, a centrifugal force acts on the mist droplets from the center toward the outside in the radial direction. The centrifugal force increases in proportion to the mass of a mist droplet. Since the mass of a mist droplet increases in proportion to the cube of the radius of the mist droplet, the centrifugal force that acts on a mist droplet increases also in proportion to the cube of the radius of the mist droplet. Accordingly, large centrifugal forces act on large mist droplets so that the large mist droplets are likely to move outward, that is, toward the interior surface of the cylinder, and are attached onto the interior surface of the cylinder. As a result, the large mist droplets flow down along the interior surface of the cone, and are fed back to the solution in the atomizer 1. On the other hand, since the fine mist droplets included in the mist-mixed air are small in mass, centrifugal forces that act on the fine mist droplets are small. Accordingly, the fine mist droplets move in a spiral together with the air as the carrier gas, and are discharged as the exhaust air from the center part of the cylinder to the outside.

According to the aforementioned classifier 3, mist droplets with a high solute concentration can be collected by separating them from the air, and be fed back to the solution, while fine mist droplets with a low solute concentration can be discharged together with the air to the outside without separating the fine mist droplets from the air so that the solute concentration can be high, in other words, the solution in the atomizer 1 can be condensed.

According to the aforementioned atomizing separation method and device, a solution is atomized into mist in air whereby producing mist-mixed air, and mist droplets included in the mist-mixed air are classified into a plurality of particle size groups according to their particle diameter sizes so that the larger mist droplets are collected and fed back to the solution, while the mist-mixed air that contains fine mist droplets are discharged as exhaust air to the outside. As a result, the solution can be condensed by removing a solvent from the solution. However, the atomizing separation method and device according to the present invention additionally may separate and collect the solvent component of the solution by liquefying the fine mist droplets that are contained in the mist-mixed air that is discharged as the exhaust air from the classifier after the classification. In this method and device, the evaporated component included in the exhaust air from which the sensible heat and the latent heat have been collected by the exhaust-heat collector is liquefied and collected. In particular, the exhaust-heat collector collects the heat of condensation by condensing the evaporated component included in the exhaust air when the latent heat is collected by the latent-heat collector. Accordingly, the evaporated component included in the exhaust air is liquefied and discharged as liquid in this process. Since the evaporated component in the exhaust air is liquefied by collecting the latent heat by using the latent-heat collector so that the solvent component of the solution can be collected as liquid, it is not necessary to provide a dedicated device for collecting the evaporated component included in the exhaust air as liquid by liquefying the evaporated component.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

What is claimed is:

1. A device for separating at least one of components with different vapor pressures from a solution that includes the components by atomizing the solution comprising:

an atomizer that atomizes the solution into mist in air whereby producing mist-mixed air;

a blower that blows air into said atomizer;

a classifier that classifies droplets of the mist included in the mist-mixed air to be discharged from said atomizer according to their particle diameter sizes, and exhausts exhaust air that contains air as carrier gas;

an exhaust-heat collector that collects heat energy of both of latent heat and sensible heat that are included in the exhaust air exhausted from said classifier; and an exhaust-heat-based heater that heats one or both of the solution in said atomizer and the air by using collection heat that is collected by the exhaust-heat collector, wherein the heat energy of both of the latent heat and sensible heat of the exhaust air, which is discharged from said atomizer, is collected as the collection heat by said exhaust-heat collector, and said exhaust-heat-based heater heats one or both of the solution in said atomizer and the air with said collection heat, and wherein said exhaust heat collector includes:

a sensible-heat collector that collects the sensible heat of said exhaust air, and a latent-heat collector that collects the latent heat from said exhaust air from which the sensible heat has been collected by said sensible-heat collector.

2. The atomizing separation device according to claim 1, wherein the solution to be atomized into mist in air by the atomizer is a solution containing a solute that has a vapor pressure lower than the solvent, and the exhaust air that contains fine mist with a smaller particle diameter, which is classified by the classifier, is exhausted to the outside, while the larger mist droplets, which are classified by the classifier, are fed back to the solution for condensation of the solution.

3. The atomizing separation device according to claim 1, wherein said latent-heat collector includes a compressor that pressurizes the exhaust air, which is exhausted from said classifier, a condenser that condenses a vaporized component that is included in the exhaust air that is pressurized by said compressor, and generates the heat of condensation, and an expansion valve that is connected to the exhaust side of said condenser, wherein said condenser is coupled to said exhaust-heat-based heater.

4. The atomizing separation device according to claim 1, wherein said latent-heat collector includes an evaporator that supplies heat energy to a refrigerant to be circulated by using the heat energy of the exhaust air, which is exhausted from said classifier, so that the refrigerant can be evaporated, a compressor that pressurizes the refrigerant gas that is discharged from said evaporator, a second condenser that cools and liquefies the refrigerant gas that is discharged from said compressor, and can generate the heat of condensation, and an expansion valve that is connected between said second condenser and said evaporator, wherein said second condenser serves as said exhaust-heat-based heater.

5. The atomizing separation device according to claim 1, wherein said exhaust-heat-based heater includes an exhaust-heat-based air heater that heats the air to be supplied to said atomizer, and an exhaust-heat-based solution heater that heats the solution to be supplied to said atomizer.

6. The atomizing separation device according to claim 1, wherein said classifier includes first and second classifiers that are connected in series to each other, wherein said mist-mixed air is supplied from said first classifier to the second classifier, and the mist droplets that are separated from the mist-mixed air by said first classifier is larger than the mist droplets that are separated from the mist-mixed air by said second classifier.

7. The atomizing separation device according to claim 1, wherein said classifier includes a cyclone classifier or a bag filter.

8. A method for separating at least one of components with different vapor pressures from a solution that includes the components by atomizing the solution with a device according claim 1, the method comprising:

atomizing a solution into mist in air whereby producing mist-mixed air; and classifying droplets of the mist included in said mist-mixed air according to their particle diameter sizes, and exhausting exhaust air that contains air as carrier gas, wherein the heat energy of both of the latent heat and sensible heat that are included in the exhaust air exhausted in said separation step are collected, and one or both of the solution to be atomized in the atomization step and air to be blown toward the solution are heated by the collected heat.

9. The atomizing separation method according to claim 8, wherein the solution to be atomized in said atomization step is a solution containing a solute that has a vapor pressure lower than the solvent, and air that contains fine mist with a smaller particle diameter is exhausted as said exhaust air, while the classified larger mist droplets are collected and fed back to the solution in said separation step for condensation of the solution.

10. The atomizing separation method according to claim 8, wherein the solution to be atomized in said atomization step or air is heated by external energy that is supplied from the outside.

11. The atomizing separation method according to claim 8, wherein after the sensible heat of said exhaust air is collected by a heat exchanger, the exhaust air, which is exhausted in said separation step, is pressurized and is supplied to a condenser, and said condenser collects the heat of condensation of a vaporized component as the latent heat of the exhaust air so that the latent heat and sensible heat of said exhaust air are collected as the collected heat.

12. The atomizing separation method according to claim 8, wherein after the sensible heat of said exhaust air is collected by a heat exchanger, the latent heat of the exhaust air which passes through said heat exchanger is collected by a heat-pump-type latent-heat-collector.

13. The atomizing separation method according to claim 8, wherein said separation step includes first and second separation steps, wherein the droplets of the mist, which is included in the mist-mixed air, are classified according to their particle diameter sizes and the classified larger mist droplets are fed back to the solution in the first separation step, and the mist droplets that are included in the mist-mixed air from which the larger mist droplets have been separated in said first separation step are further classified according to their particle diameter sizes, and the further-classified relatively larger mist droplets are fed back to the solution, while the mist-mixed air that contains fine mist after the relatively larger mist droplets are separated are exhausted as the exhaust air in the second separation step, wherein the larger mist droplets that are separated and fed back to the solution in said first separation step have particle diameters larger than the relatively larger mist droplets that are separated in said second separation step.

14. The atomizing separation method according to claim 8, wherein the flow rate of the mist-mixed air is not greater than 0.5 m/sec in said separation step.

15. The atomizing separation method according to claim 8 further comprising filtering the solution to be atomized before said atomization step, wherein a part of solvent is removed by passing the solution through a reverse osmotic membrane in the filtration step, and the liquid from which the part of solvent has been removed is atomized into mist in said atomization step.

* * * * *